(12) United States Patent
Song et al.

(10) Patent No.: US 12,075,378 B2
(45) Date of Patent: Aug. 27, 2024

(54) METHOD FOR TRANSMITTING AND RECEIVING DATA IN WIRELESS COMMUNICATION SYSTEM AND APPARATUS THEREFOR

(71) Applicant: LG ELECTRONICS INC., Seoul (KR)

(72) Inventors: Huayue Song, Seoul (KR); Hyangsun You, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 842 days.

(21) Appl. No.: 17/252,715

(22) PCT Filed: May 9, 2019

(86) PCT No.: PCT/KR2019/005570
§ 371 (c)(1),
(2) Date: Nov. 5, 2021

(87) PCT Pub. No.: WO2020/004808
PCT Pub. Date: Jan. 2, 2020

(65) Prior Publication Data
US 2022/0070809 A1 Mar. 3, 2022

Related U.S. Application Data

(60) Provisional application No. 62/691,659, filed on Jun. 29, 2018.

(51) Int. Cl.
*H04W 56/00* (2009.01)
*H04W 72/0446* (2023.01)
*H04W 72/20* (2023.01)

(52) U.S. Cl.
CPC ... *H04W 56/0045* (2013.01); *H04W 72/0446* (2013.01); *H04W 72/20* (2023.01)

(58) Field of Classification Search
CPC . H04W 40/22; H04W 88/04; H04W 56/0045; H04W 72/0446; H04W 72/20
See application file for complete search history.

(56) References Cited

U.S. PATENT DOCUMENTS

2010/0150022 A1* 6/2010 Cai ............... H04B 7/15542
370/254
2016/0198389 A1* 7/2016 Cao ............... H04W 40/22
370/315

(Continued)

FOREIGN PATENT DOCUMENTS

KR  1020160145648   12/2016
WO  2017171284      10/2017

OTHER PUBLICATIONS

PCT International Application No. PCT/KR2019/005570, International Search Report dated Sep. 11, 2019, 3 pages.

(Continued)

*Primary Examiner* — Raj Jain
(74) *Attorney, Agent, or Firm* — LEE, HONG, DEGERMAN, KANG & WAIMEY

(57) ABSTRACT

The present specification provides a method for transmitting and receiving data by a relay node in a wireless communication system and an apparatus therefor. The relay node receives configuration information from a network node, wherein the configuration information may include a timing offset for transmitting downlink data. The relay node transmits the downlink data to a second relay node on the basis of the configuration information, in which transmission timing of the downlink data may be determined on the basis of the timing offset and a timing advance (TA).

11 Claims, 20 Drawing Sheets

(56) References Cited

U.S. PATENT DOCUMENTS

2019/0349036 A1* 11/2019 Wang ................. H04B 7/15528
2022/0070809 A1*  3/2022 Song ................. H04W 72/0446

OTHER PUBLICATIONS

OPPO, "Discussion of backhaul link enhancement for IAB", 3GPP TSG RAN WG1 Meeting #93, R1-1806859, May 2018, 5 pages.
Nokia, et al., "Dynamic resource allocation between backhaul and access links", 3GPP TSG RAN WG1 Meeting #93, R1-1806662, May 2018, 6 pages.
VIVO, "Enhancements to support NR backhaul link", 3GPP TSG RAN WG1 Meeting #93, R1-1806089, May 2018, 3 pages.

* cited by examiner (a)

METHOD FOR TRANSMITTING AND RECEIVING DATA IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/005570, filed on May 9, 2019, which claims the benefit of U.S. Provisional Application No. 62/691,659, filed on Jun. 29, 2018, the contents of which are all incorporated by reference herein in their entirety.

TECHNICAL FIELD

The present disclosure relates to a wireless communication system, and more particularly, to a method for determining timing for transmitting and receiving data and an apparatus supporting the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

An embodiment of the present disclosure provides a method for determining transmission and reception timing for transmitting and receiving data in a wireless communication system and an apparatus therefor.

Specifically, an embodiment of the present disclosure also provides a method for adjusting transmission and reception timing between respective nodes and a apparatus therefor when a backhaul link between nodes of a network is wireless.

Furthermore, an embodiment of the present disclosure provides a method for preventing interference from being increased due to a mismatch between symbols or slot boundaries of signals and an apparatus therefor, when a relay nodes simultaneously transmits or receives a signal because propagation delays of the backhaul link and an access link are different.

Objects of the disclosure are not limited to the foregoing, and other unmentioned objects would be apparent to one of ordinary skill in the art from the following description.

Technical Solution

According to an embodiment of the present disclosure, a method for transmitting/receiving data by a first relay node in a wireless communication system includes: receiving configuration information from a network node, in which the configuration information includes a timing offset for transmitting downlink data; and transmitting, to a second relay node, the downlink data based on the configuration information, in which transmission timing of the downlink data is determined based on the timing offset and a timing advance (TA).

Furthermore, in the present disclosure, the TA is acquired from the network node or calculated based on the configuration information.

Furthermore, in the present disclosure, the first relay node transmits/receives data to/from other nodes through a backhaul link and transmits/receives data to/from a terminal through an access link.

Furthermore, in the present disclosure, the first relay node is capable of simultaneously performing transmission/reception of data through the backhaul link and the access link by using a method such as Frequency Division Multiplexing (FDM), Spatial Division Multiplexing (SDM), or Time Division Multiplexing (TDM).

Furthermore, in the present disclosure, when the first relay node simultaneously performs transmission/reception of data through the backhaul link and the access link by using the FDM, different slot formats are configured in the backhaul link and the access link in order to match transmission timing with another node of the first relay node or the terminal.

Furthermore, in the present disclosure, the transmission timing and reception timing of uplink transmission and downlink transmission of the network node, the first relay node, and the second relay node are absolutely the same.

Furthermore, in the present disclosure, the method further includes: receiving a synchronization signal from the network node; and performing synchronization with the network node based on the synchronization signal.

Furthermore, in the present disclosure, when uplink transmission and downlink transmission are performed by using the TDM method through the backhaul link or the access link,
a transmission gap for matching a boundary between symbols is inserted between the uplink transmission and the downlink transmission.

Furthermore, in the present disclosure, the transmission gap is divided into a first transmission gap inserted when the uplink transmission is switched to the downlink transmission or a second transmission gap inserted when the downlink transmission is switched to the uplink transmission.

Furthermore, in the present disclosure, at least one of the first transmission gap or the second transmission gap is acquired from the network node.

Furthermore, in the present disclosure, when the first transmission gap or the second transmission gap is acquired from the network node, the first transmission gap is configured to a value acquired by excluding the second transmission gap from a symbol length, and the second transmission gap is configured to a value acquired by excluding the first transmission gap from the symbol length.

Furthermore, in the present disclosure, wherein a first transmission gap for matching a symbol boundary of the backhaul link and the symbol boundary of the access link is inserted when transmission through the backhaul link is switched to transmission through the access link, and a second transmission gap for matching the symbol boundary of the backhaul link and the symbol boundary of the access link is inserted when the transmission through the access link is switched to the transmission through the backhaul link.

Furthermore, in the present disclosure, at least one of the first transmission gap and/or the second transmission gap is acquired from the network node.

According to an embodiment of the present disclosure, a first relay node for transmitting/receiving data in a wireless communication system includes: a radio frequency (RF) module for transmitting and receiving a radio signal; and a processor functionally connected to the RF module, in which the processor is configured to receive configuration information from a network node, in which the configuration information includes a timing offset for transmitting downlink data, and transmit, to a second relay node, the downlink data based on the configuration information, in which transmission timing of the downlink data is determined based on the timing offset and a timing advance (TA).

Advantageous Effects

According to an embodiment of the present disclosure, there is an effect that transmission and reception timing between respective nodes can be adjusted when a backhaul link between nodes of a network is wireless.

Furthermore, there is an effect that interference can be prevented from being increased by adjusting transmission and reception timing between the nodes when propagation delays of the backhaul link and an access link are different.

Effects of the disclosure are not limited to the foregoing, and other unmentioned effects would be apparent to one of ordinary skill in the art from the following description.

DESCRIPTION OF DRAWINGS

In order to help understanding of the present disclosure, the accompanying drawings which are included as a part of the Detailed Description provide embodiments of the present disclosure and describe the technical features of the present disclosure together with the detailed description.

FIG. 12 is a diagram illustrating one example of timing of the access link and the backhaul link when the Time Division Multiplexing (TDM) method is not used according to an embodiment of the present disclosure.

FIG. 14 is a diagram illustrating one example of the timing of the access link and the backhaul link when the Time Division Multiplexing (TDM) method is used according to an embodiment of the present disclosure.

MODE FOR INVENTION

Figure 1:
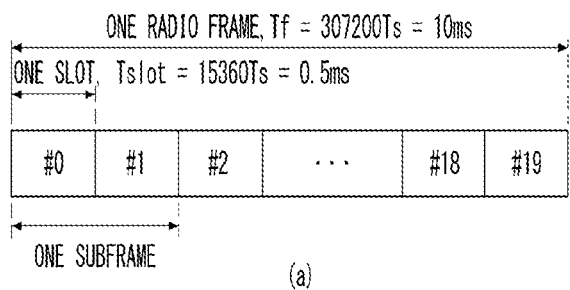
FIG. 1 illustrates a structure of a radio frame in a wireless communication system to which the present disclosure may be applied.
Figure 1:
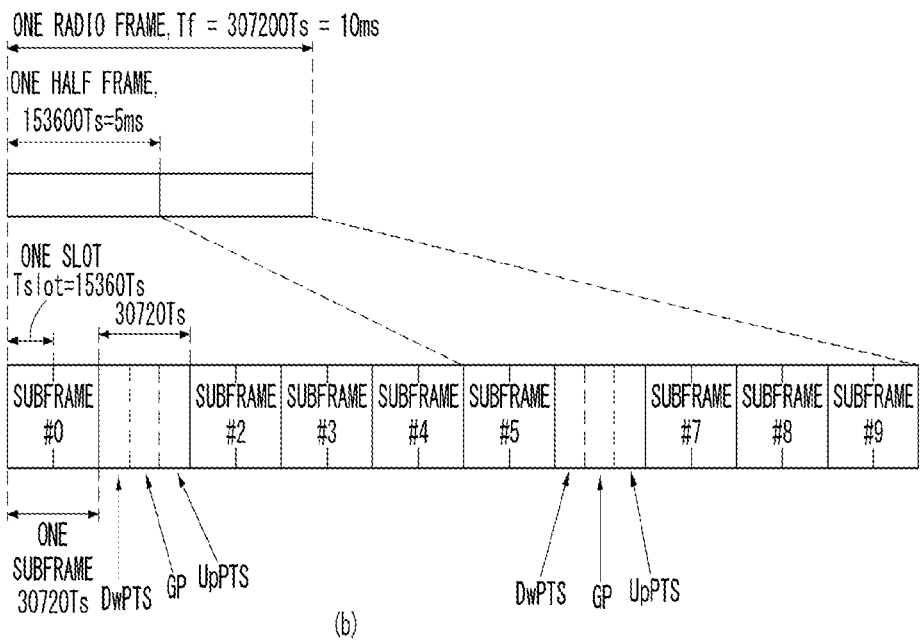

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

In the disclosure, "base station" means a network terminal node to directly communicate with a user equipment (UE). In the disclosure, a particular operation described to be performed by a base station may be performed by an upper node of the base station in some cases. In other words, in a network constituted of multiple network nodes including the base station, various operations performed to communicate with a UE may be performed by the base station or other network nodes than the base station. "Base station (BS)"

may be interchangeably used with the term "fixed station," "Node B," "eNB (evolved-NodeB)," "BTS (base transceiver system)," AP (Access Point)," or "gNB (next generation NB, general NB, gNodeB)". "Terminal" may refer to a stationary or mobile device and may be interchangeably used with the term "UE (User Equipment)," "MS (Mobile Station)," "UT (user terminal)," "MSS (Mobile Subscriber Station)," "SS (Subscriber Station)," "AMS (Advanced Mobile Station)," "WT (Wireless terminal)," "MTC (Machine-Type Communication) device," "M2M (Machine-to-Machine) device," or "D2D (Device-to-Device) device."

Hereinafter, downlink (DL) means communication from a base station to a terminal, and uplink (UL) means communication between a terminal to a base station. For downlink, a transmitter may be part of a base station, and a receiver may be part of a terminal. For uplink, a transmitter may be part of a terminal, and a receiver may be part of a base station.

The terminology used herein is provided for a better understanding of the disclosure, and changes may be made thereto without departing from the technical spirit of the disclosure.

The following technology may be used in various radio access systems, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). CDMA may be implemented as radio technology, such as universal terrestrial radio access (UTRA) or CDMA2000. TDMA may be implemented as GSM (global system for mobile communications)/GPRS (general packet radio service)/EDGE (enhanced data rates for GSM evolution). OFDMA may be implemented as radio technology, such as IEEE 802.11 (Wi-Fi), IEEE 802.16 (WiMAX), IEEE 802-20, or E-UTRA(evolved UTRA). UTRA is part of UMTS (universal mobile telecommunications system). 3GPP (3rd generation partnership project) LTE(long term evolution) is part of E-UMTS (evolved UMTS) using E-UTRA and adopts OFDMA for downlink and SC-FDMA for uplink. LTE-A (advanced) is an evolution of 3GPP LTE.

5G NR defines enhanced mobile broadband (eMBB), massive machine type communications (mMTC), ultra-reliable and low latency communications (URLLC), and vehicle-to-everything (V2X) depending on usage scenarios.

The 5G NR standards are divided into standalone (SA) and non-standalone (NSA) depending on co-existence between the NR system and the LTE system.

5G NR supports various subcarrier spacings and supports CP-OFDM on downlink and CP-OFDM and DFT-s-OFDM (SC-OFDM) on uplink.

The three main requirements areas for 5G include (1) Enhanced Mobile Broadband (eMBB) area, (2) Massive Machine Type Communication (mMTC) area, and (3) Ultra-reliable and Low Latency Communications, URLLC) area.

In some use cases, multiple areas may be required for optimization, and other use cases may be focused on only one key performance indicator (KPI). 5G is to support these various use cases in a flexible and reliable way.

eMBB goes far beyond basic mobile Internet access, covering rich interactive work, media and entertainment applications in the cloud or augmented reality. Data is one of the key drivers of 5G, and it may not be possible to see dedicated voice services for the first time in the 5G era. In 5G, voice is expected to be processed as an application program simply using the data connection provided by the communication system. The main reasons for the increased traffic volume are an increase in content size and an increase in the number of applications requiring high data rates. Streaming services (audio and video), interactive video and mobile Internet connections will become more widely used as more devices connect to the Internet. Many of these applications require always-on connectivity to push real-time information and notifications to the user. Cloud storage and applications are rapidly increasing in mobile communication platforms, which can be applied to both work and entertainment. And, cloud storage is a special use case that drives the growth of the uplink data rate. 5G is also used for remote work in the cloud and requires much lower end-to-end latency to maintain a good user experience when tactile interfaces are used. Entertainment For example, cloud gaming and video streaming is another key factor that is increasing the demand for mobile broadband capabilities. Entertainment is essential on smartphones and tablets anywhere, including high mobility environments such as trains, cars and airplanes. Another use case is augmented reality and information retrieval for entertainment. Here, augmented reality requires very low latency and an instantaneous amount of data.

In addition, one of the most anticipated 5G use cases concerns the ability to seamlessly connect embedded sensors in all fields, i.e. mMTC. By 2020, potential IoT devices are expected to reach 20.4 billion. Industrial IoT is one of the areas where 5G plays a major role in enabling smart cities, asset tracking, smart utilities, agriculture and security infrastructure.

URLLC includes new services that will transform the industry with ultra-reliable/low-latency links such as self-driving vehicles and remote control of critical infrastructure. The level of reliability and delay is essential for smart grid control, industrial automation, robotics, drone control and coordination.

Next, look at a number of examples in more detail.

5G can complement fiber-to-the-home (FTTH) and cable-based broadband (or DOCSIS) as a means of providing streams rated at hundreds of megabits per second to gigabits per second. This high speed is required to deliver TVs in 4K or higher (6K, 8K and higher) resolutions as well as virtual and augmented reality. Virtual Reality (VR) and Augmented Reality (AR) applications involve almost immersive sports events. Certain application programs may require special network settings. For example, in the case of VR games, game companies may need to integrate the core server with the network operator's edge network server to minimize latency.

Automotive is expected to be an important new driving force in 5G, with many use cases for mobile communication to vehicles. For example, entertainment for passengers demands simultaneous high capacity and high mobility mobile broadband. The reason is that future users will continue to expect high-quality connections, regardless of their location and speed. Another application example in the automotive field is an augmented reality dashboard. It identifies an object in the dark on top of what the driver is looking through the front window, and displays information that tells the driver about the distance and movement of the object overlaid. In the future, wireless modules enable communication between vehicles, exchange of information between the vehicle and the supporting infrastructure, and exchange of information between the vehicle and other connected devices (eg, devices carried by a pedestrian). The safety system can lower the risk of an accident by guiding the driver through alternate courses of action to make driving safer. The next step will be a remote controlled or self-driven vehicle. This requires very reliable and very fast communication between different self-driving vehicles and between the vehicle and the infrastructure. In the future, self-driving vehicles will perform all driving activities, and drivers will be forced to focus only on traffic anomalies that the vehicle itself cannot identify. The technical requirements of self-driving vehicles call for ultra-low latency and ultra-fast reliability to increase traffic safety to levels unachievable by humans.

Smart cities and smart homes, referred to as smart society, will be embedded with high-density wireless sensor networks. A distributed network of intelligent sensors will identify the conditions for cost and energy-efficient maintenance of a city or home. A similar setup can be done for each household. Temperature sensors, window and heating controllers, burglar alarms and appliances are all wirelessly connected. Many of these sensors are typically low data rates, low power and low cost. However, for example, real-time HD video may be required in certain types of devices for surveillance.

The consumption and distribution of energy, including heat or gas, is highly decentralized, requiring automated control of distributed sensor networks. The smart grid interconnects these sensors using digital information and communication technologies to gather information and act accordingly. This information can include the behavior of suppliers and consumers, allowing smart grids to improve efficiency, reliability, economics, sustainability of production and the distribution of fuels such as electricity in an automated manner. The smart grid can also be viewed as another low-latency sensor network.

The health sector has many applications that can benefit from mobile communications. The communication system can support telemedicine providing clinical care from remote locations. This can help reduce barriers to distance and improve access to medical services that are not consistently available in remote rural areas. It is also used to save lives in critical care and emergencies. A wireless sensor network based on mobile communication can provide sensors and remote monitoring of parameters such as heart rate and blood pressure.

Wireless and mobile communications are becoming increasingly important in industrial applications. Wiring is expensive to install and maintain. Thus, the possibility of replacing cables with reconfigurable wireless links is an attractive opportunity for many industries. However, achieving this requires that the wireless connection operates with a delay, reliability and capacity similar to that of the cable, and its management is simplified. Low latency and very low error probability are new requirements that need to be connected to 5G.

Logistics and freight tracking are important examples of use for mobile communications that enable tracking of inventory and packages from anywhere using location-based information systems. Logistics and freight tracking use cases typically require low data rates, but require a wide range and reliable location information.

Embodiments of the disclosure may be supported by the standard documents disclosed in IEEE 802, 3GPP, and 3GPP2 which are radio access systems. In other words, in the embodiments of the disclosure, steps or parts skipped from description to clearly disclose the technical spirit of the disclosure may be supported by the documents. All the terms disclosed herein may be described by the standard documents.

Although the description focuses primarily on 3GPP LTE/LTE-A/NR (New RAT) for clarity, the technical features of the disclosure are not limited thereto.

Terminology eLTE eNB: eLTE eNB is an evolution of eNB supporting connectivity to EPC and NGC.

gNB: A node supporting NR as well as connectivity with NGC.

New RAN: A radio access network interacting with NGC or supporting NR or E-UTRA.

Network slice: A network defined by the operator to provide the optimized solution on a specific market scenario with a specific requirement along with an end-to-end range.

Network function: A logical node in a network infrastructure with a well-defined functional operation and external interface.

NG-C: A control plane interface used at an NG2 reference point between new RAN and NGC.

NG-U: A user plane interface used at an NG3 reference point between new RAN and NGC.

Non-standalone NR: An arrangement in which gNB requires LTE eNB as an anchor for control plane connection to EPC or eLTE eNB as an anchor for control plane connection to NGC.

Non-standalone E-UTRA: An arrangement in which eLTE eNB requires gNB as an anchor for control plane connection to NGC.

User plane gateway: An end point of NG-U interface.

Numerology: this corresponds to one subcarrier spacing in the frequency domain. A different numerology may be defined by scaling a reference subcarrier spacing using an integer N.

NR: NR Radio Access or New Radio

General System to which the Present Disclosure May be Applied

FIG. 1 shows the structure of a radio frame in a wireless communication system to which an embodiment of the present disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of T_s=1/(15000*2048). A UL and DL transmission includes the radio frame having a duration of T_f=307200*T_s=10 ms.

FIG. 1(a) exemplifies a radio frame structure type 1. The type 1 radio frame may be applied to both of full duplex FDD and half duplex FDD.

A radio frame includes 10 subframes. A radio frame includes 20 slots of T_slot=15360*T_s=0.5 ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of 153600*T_s=5 ms length each. Each half frame includes 5 subframes of 30720*T_s=1 ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

Table 2 below represents a configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of a radio frame shown in FIG. 1 is only one example. The number of subcarriers included in a radio frame or the number of slots included in a subframe and the number of OFDM symbols included in a slot may be changed in various ways.

Figure 2:
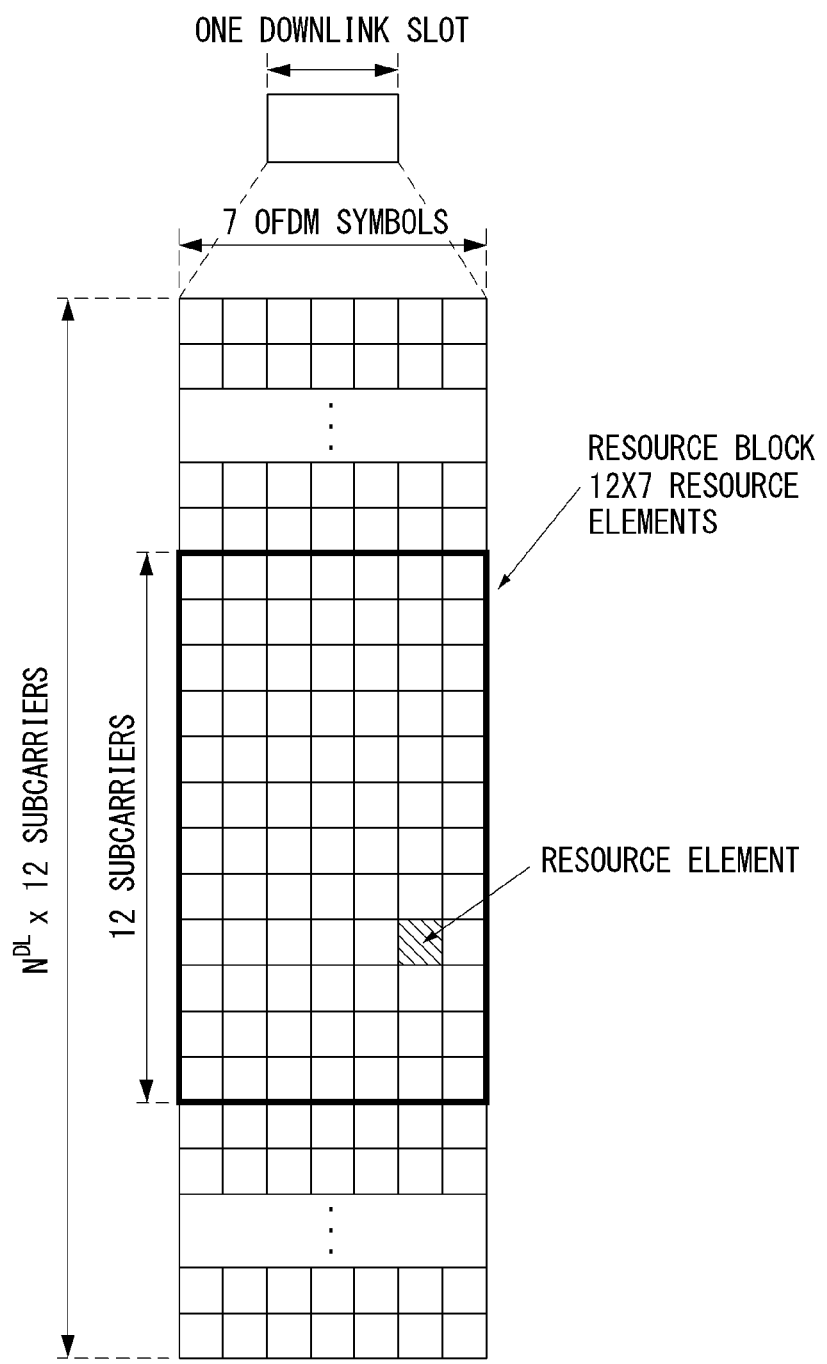
FIG. 2 is a diagram illustrating a resource grid for one downlink slot in the wireless communication system to which the present disclosure may be applied.

FIG. 2 is a diagram illustrating a resource grid for one downlink slot in the wireless communication system to which the present disclosure can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present disclosure is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
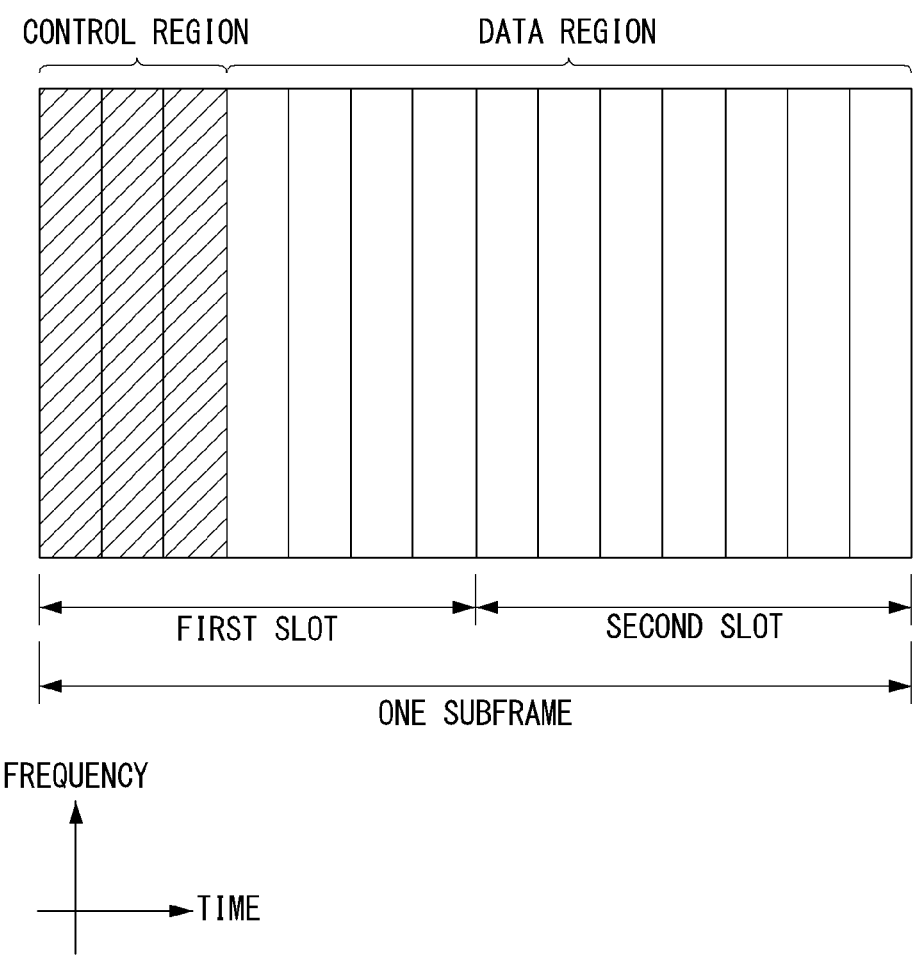
FIG. 3 illustrates a structure of a downlink subframe in a wireless communication system to which the present disclosure may be applied.

FIG. 3 illustrates a structure of a downlink subframe in the wireless communication system to which the present disclosure can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

Figure 4:
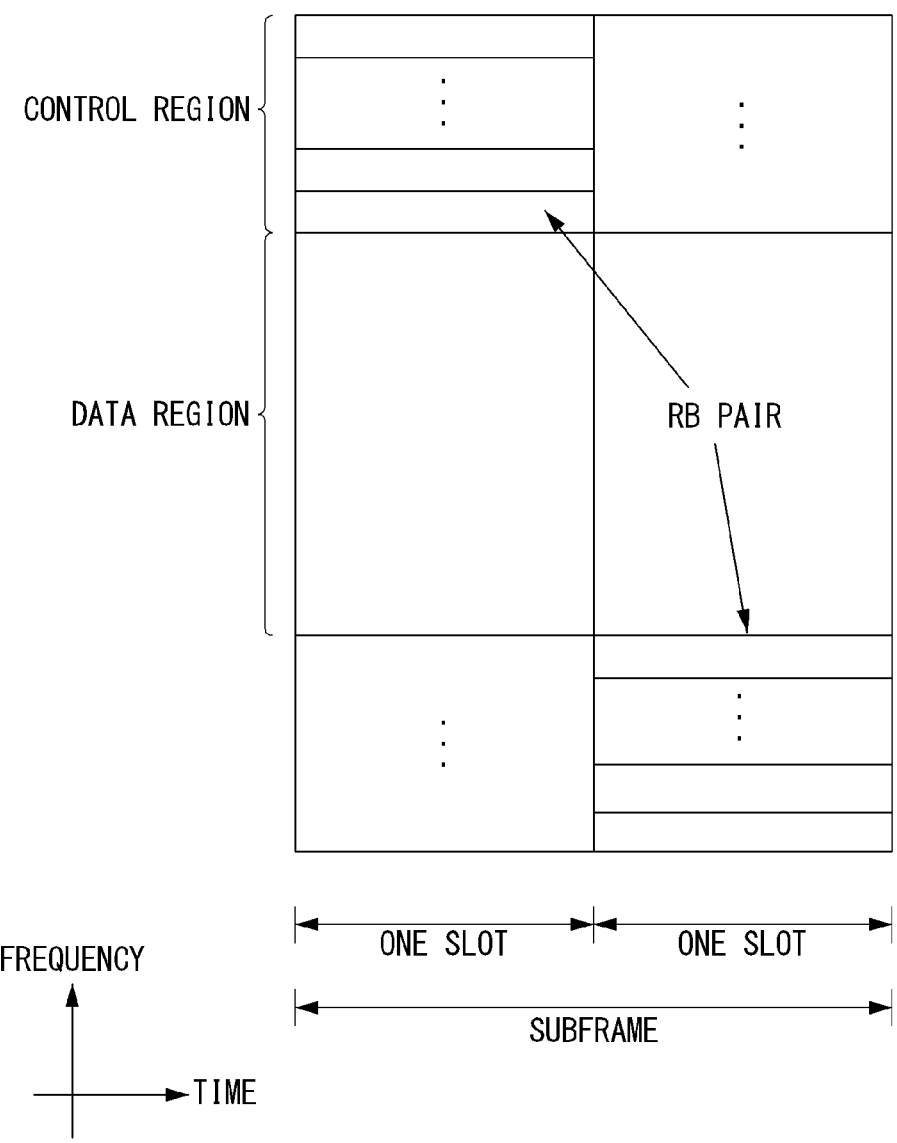
FIG. 4 illustrates a structure of an uplink subframe in a wireless communication system to which the present disclosure may be applied.

FIG. 4 illustrates a structure of an uplink subframe in the wireless communication system to which the present disclosure can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Figure 5:
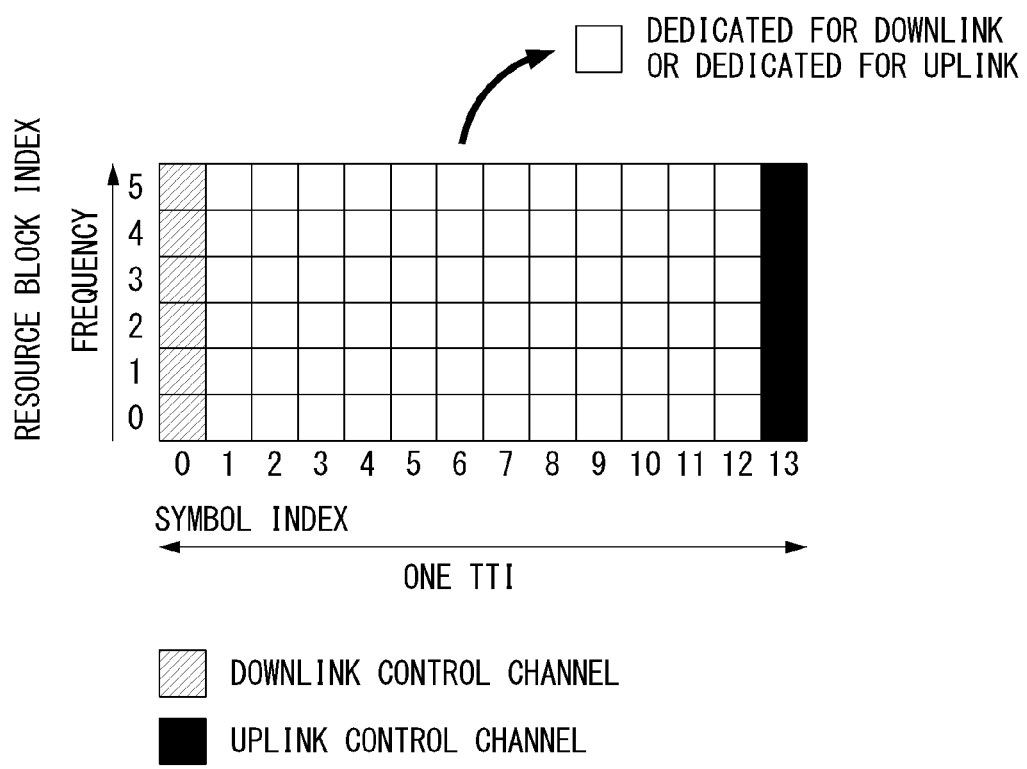
FIG. 5 is a diagram illustrating one example of a self-contained slot structure to which a method proposed in the present disclosure may be applied.

FIG. 5 is a diagram illustrating Self-contained subframe structure in a wireless communication system to which the present disclosure may be applied.

In order to minimize the data transmission latency in TDD system, the self-constrained subframe structure as shown in FIG. 5 has been considered in 5 generation (5G) new RAT.

In FIG. 5, the shaded area (symbol index 0) represents DL control region, and dark area (symbol index 13) represents UL control region. The area which is not shaded may be used for DL data transmission or UL data transmission. This structure is characterized that DL transmission and UL transmission are sequentially progressed in a single subframe, and DL data may be transmitted in the subframe, and UL ACK/NACK may also be received. Consequently, when a data transmission error occurs, a time consumed till a data retransmission may be reduced, and accordingly, latency of final data forwarding may be minimized.

In such a self-contained subframe structure, a time gap is required for the switching process for an eNB and a UE from transmission mode to reception mode or the switching process from reception mode to transmission mode. For this, in the self-contained subframe structure, a part of OFMD symbol of the timing switched from DL to UL is configured as a guard period (GP).

Analog Beamforming

In a millimeter wave (mmW), a wavelength is shortened, so that a plurality of antenna elements can be installed in the same area. That is, a total of 64 (8×8) antenna elements can be installed in a 2-dimension array at a 0.5 lambda (that is, wavelength) interval on a panel of 4×4 (4 by 4) cm with a wavelength of 1 cm in a 30 GHz band. Therefore, in the mmW, it is possible to increase a beamforming (BF) gain to increase coverage or increase throughput by using multiple antenna elements.

In this case, if a transceiver unit (TXRU) is provided so that transmission power and phase can be adjusted for each antenna element, independent beamforming is possible for each frequency resource. However, when the TXRUs are installed on all 100 antenna elements, there is a problem that effectiveness is deteriorated in terms of costs. Therefore, a method of mapping a plurality of antenna elements to one TXRU and adjusting a direction of a beam using an analog phase shifter is considered. Such an analog BF method has a disadvantage in that frequency selective BF cannot be performed by making only one beam direction in all bands.

A hybrid BF with B TXRUs, which is an intermediate form of digital BF and analog BF, and fewer than Q antenna elements, can be considered. In this case, although there is a difference depending on a connection method of B TXRUs and Q antenna elements, the number of directions of the beams that can be transmitted at the same time is limited to B or less.

In the present disclosure, for convenience of description, a proposed method will be described based on a new RAT (NR) system. However, a range of the system to which the proposed method is applied may be extended to other systems such as the 3GPP LTE/LTE-A system in addition to the new RAT system.

Figure 6:
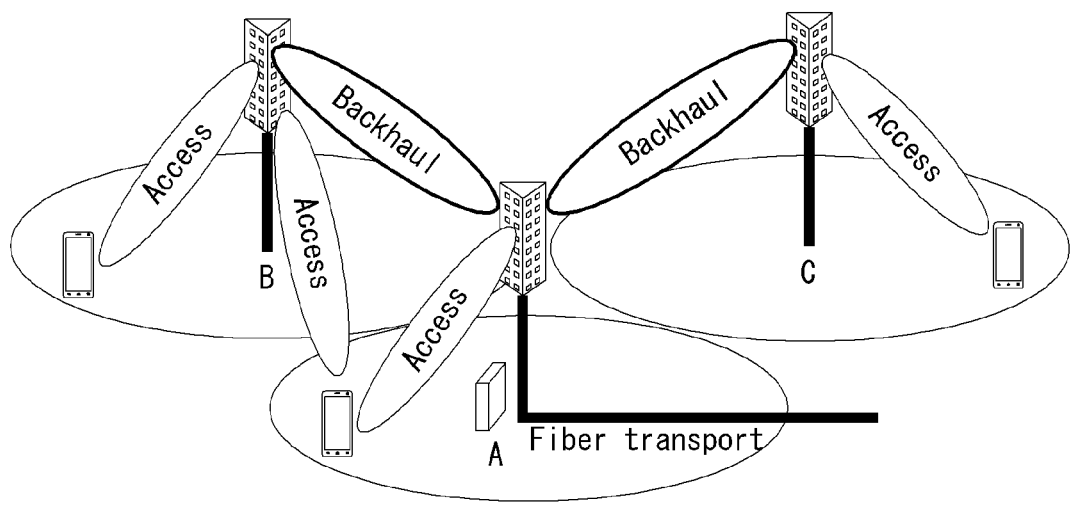
FIG. 6 is a diagram illustrating one example of an Integrated access and backhaul (IAB) link to which a method proposed in the present disclosure may be applied.

FIG. 6 is a diagram illustrating one example of an Intergrated access and backhaul (IAB) link to which a method proposed in the present disclosure may be applied.

One of the potential technologies that will enable future cellular network deployment scenarios and applications supports wireless backhaul and relay links to deploy NR cells flexibly and very densely without crowding transport networks.

In NR, an integrated access and backhaul link may be used because an expected bandwidth available in NR is large compared to LTE (e.g., mmWave spectrum) with basic deployment of a massive MIMO or multi-beam system.

This enables easy deployment of a dense network of self-backhauled NR cells in a more integrated method by establishing a plurality of control and data channels and/or procedures defined to provide access to the UE.

For example, as illustrated in FIG. 6, the network may be configured with the integrated access and backhaul link. Transmission and reception of data is enabled through the backhaul link among relay nodes (rTRP) A, B, and C and transmission and reception of the data is enabled through the access link between the relay node and the UE.

In FIG. 6, the relay node may multiplex the access and backhaul links in a time, a frequency, or a space (e.g., beam based operation).

Operations of different links may be performed in the same or difference frequencies (or, 'in-band' or 'out-band' relay). Efficient support o the 'out-band' relay is important in some NR scenarios, but there is an important issue to accept dual frequency limits and understand requirements and avoiding/mitigating of an 'in-band' operation of implying tight interworking with the access link which operates in the same frequency.

In addition, the operation of the NR system in the mmWave spectrum has some problems including severe short-term blocking that may not be easily mitigated by the current RRC-based handover mechanism because of the larger time-scales required to complete the procedure compared to short-term blocking.

Hereinafter, Integrated Access and Backhaul (IAB) in NR requires the following requirements.

Figure 7:
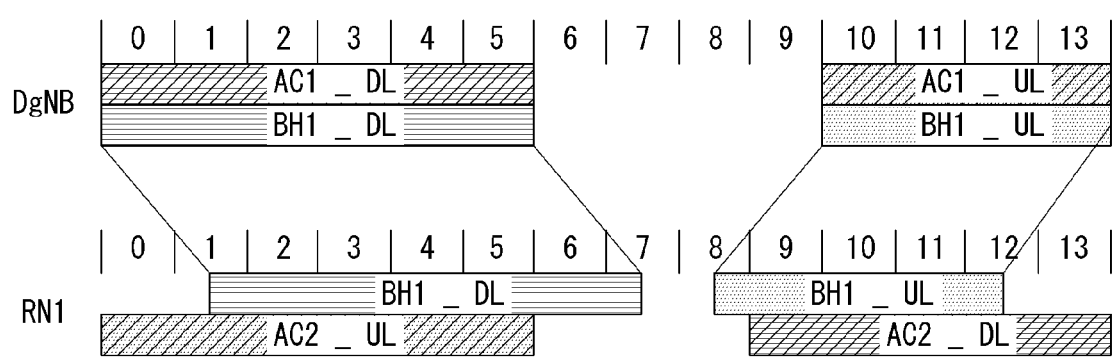
FIG. 7 is a diagram illustrating one example of timing of each node in transmission and reception of a signal using a single hop to which a method proposed in the present disclosure may be applied.

Efficient and flexible operation for 'in-band' and 'out-band' relays in indoor and outdoor scenarios
Multiple hops and redundant connections
End-to-end path selection and optimization
Backhaul link support with high spectral efficiency
Support for legacy NR UEs FIG. 7 is a diagram illustrating one example of timing of each node in transmission and reception of a signal using a single hop to which a method proposed in the present disclosure may be applied.

In the NR system, it is required to flexibly schedule UEs having various attributes to perform data transmission and reception accurately and efficiently. As the number of users increases in the NR system, the number of additionally installed base stations or relay nodes may increase.

In this case, due to the installation of a large number of base stations or relay nodes, connecting the base station and the relay nodes through wires may be expensive. In this case, when designing the backhaul link wirelessly, the initial installation cost may be reduced, but the following problems may occur.

For example, because the propagation delays between the backhaul link and the access link are different, if transmission or reception is simultaneously performed in one relay node (RN), a symbol or a slot boundary between transmitted and received signals is mismatched, and as a result, interference may be increased.

Accordingly, the present disclosure proposes a method for configuring the backhaul link wirelessly in order to solve the problem.

Furthermore, proposed is a method for solving a problem related to timing between the nodes when the backhaul link is configured wirelessly.

Specifically, it is difficult to match symbol boundaries between the access link and the backhaul link due to the propagation delay of transmission and reception through the backhaul link. Since a distance between RNs is not the same but diversified in the network, as the number of hops increases, a delay time of signal transmission using multiple hops may be further diversified.

As illustrated in FIG. 7, when the transmission/reception symbol timings of each link are based on DgNB, a downlink symbol (DL symbol) of the backhaul link at the RN side may start in the middle of a first symbol, and an uplink symbol (UL symbol) of the access link may start at the 0th symbol.

In this case, when a plurality of UEs access one RN, there is a problem that it is difficult to control (or handle) the RN side when a similar event occurs.

Accordingly, the present disclosure proposes a method for transmitting and receiving the signal through the TDM method between the access link and the backhaul link or separately operating the respective transmission and reception timings without mismatching the symbol boundaries of the access link and the backhaul link in order to solve the problems.

Hereinafter, the IAB node may mean a node capable of performing both the functions of the UE and the base station. For example, the IAB node may play a role of the UE in a relationship with a specific base station, and may play a role of the base station (or node) in a relationship with a specific note or UE.

<Embodiment 1 Synchronization Among IAB Nodes>

Figure 8:
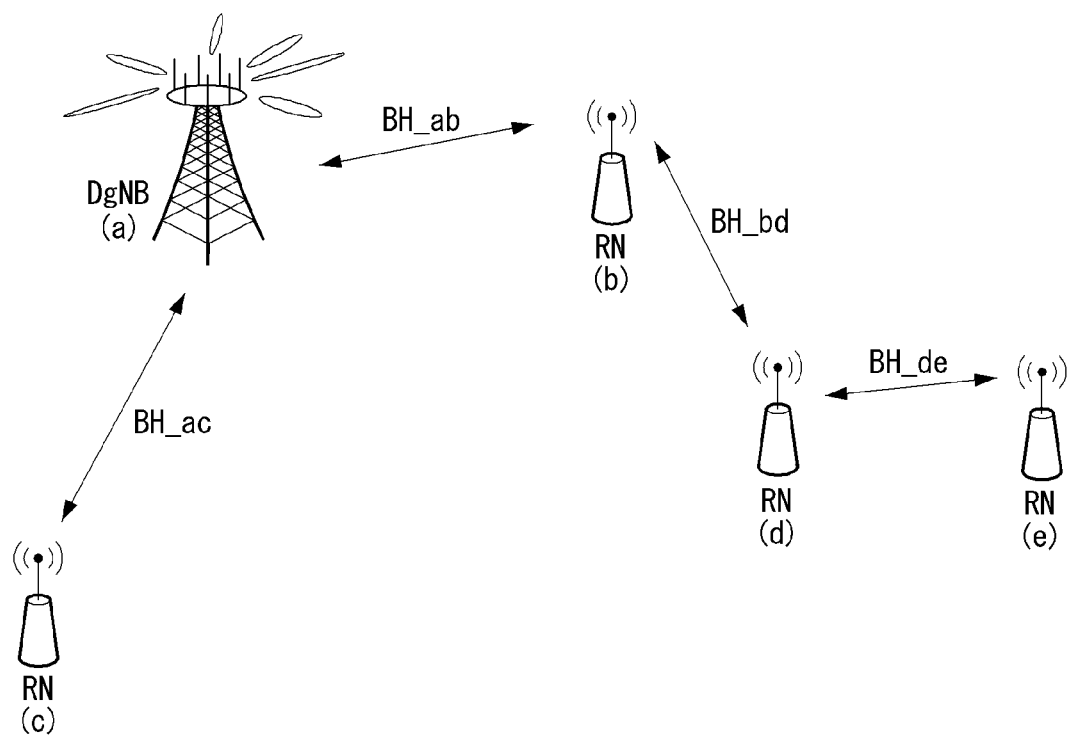
FIGS. 8 and 9 are diagrams illustrating one example of signal transmission and reception and timing between backhaul links to which a method proposed in the present disclosure may be applied.
Figure 9:
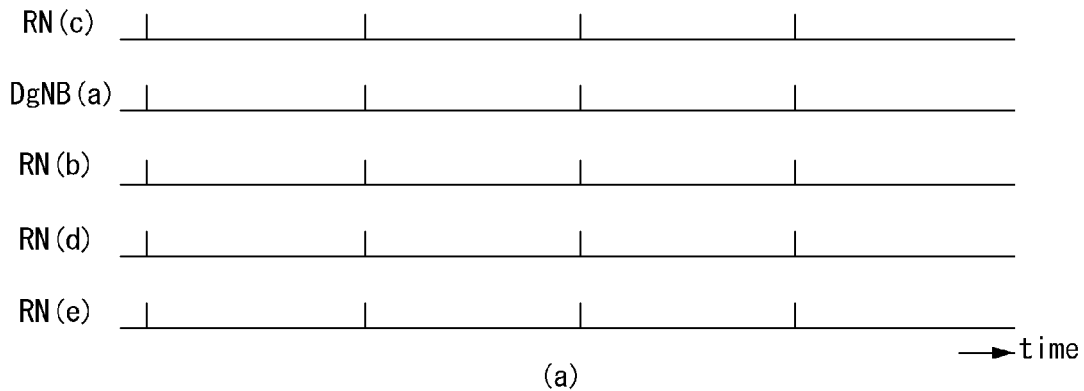
Figure 9:
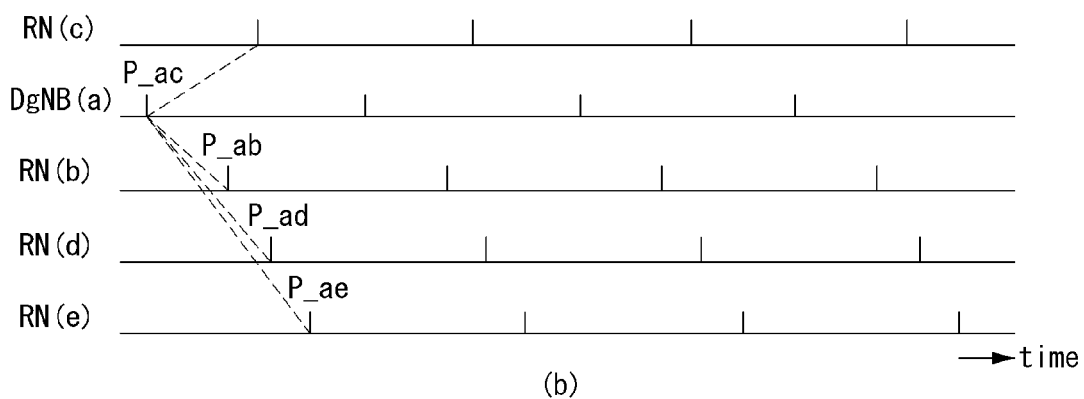
Figure 9:
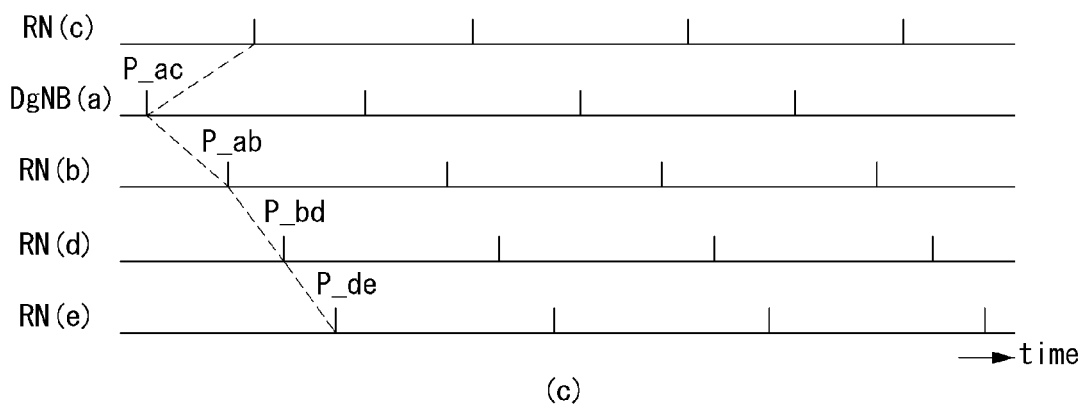

FIGS. 8 and 9 are diagrams illustrating one example of signal transmission and reception and timing between backhaul links to which a method proposed in the present disclosure may be applied.

When a gNB (or Donor gNB: DgNB) managing the network, a plurality of RNs, and a plurality of UEs transmit and receive signals through a wireless backhaul link and a wireless access link, the symbol boundary may be matched by adjusting the transmission timing and/or reception timing through synchronization among nodes performing the IAB function.

Embodiment 1-1: Method in which gNB and RNs have Transmission/Reception Timing which is Absolutely Matched The relay nodes constituting the network may have different transmission timing and/or reception timing according to a parent node that is an upper node thereof. In this case, when the relay nodes perform the function of the base station, the transmission timing of the base station may be frequently changed, so it may be difficult for the UE to match the data transmission/reception timing.

Accordingly, by configuring the transmission timing and reception timing of the parent node and the child nodes to have an absolutely identical timing, the relay nodes may prevent the transmission timing and reception timing from being changed according to the parent nodes.

That is, the gNB which is the parent node and the RNs having the IAB function may absolutely have the identical frame timing through synchronization based on a Global Navigation Satellite System (GNSS).

For example, the slot boundaries of the access links of the respective nodes may have the same timing for the gNB and each RN.

When the gNB and the IAB RNs constitute the network as illustrated in FIG. 8, the downlink transmission timing and the uplink reception timing of the access link for the gNB and each RN may be matched with each other as illustrated in FIG. 9(a).

The transmission/reception timing may be a slot boundary/frame timing used when each RN supports the access link. The following method may be applied in order to match the timing between the gNB and the RNs.

Global synchronization through GNSS
It may be considered that synchronization is performed based on a signal transmitted from the gNB and the propagation delay is subtracted from the timing advance (TA). That is, the gNB and the RN may transmit and receive synchronization signals and estimate the propagation delay and the timing may be adjusted by subtracting timing of receiving the signal transmitted by the gNB from the estimated propagation delay. Alternatively, in a multi-hop situation, synchronization may be performed based on a signal transmitted from the parent node instead of the gNB, and the timing may be adjusted by subtracting the propagation delay from the corresponding parent node from the TA.

The timing of the RN may be adjusted using a precision time protocol (PTP), that is, a standard time transmission protocol that may be synchronized through inter-cell messages. In this case, the standard time transmission protocol may enable accurate synchronization between the networks.

In this case, in consideration of a time required for the relay node to switch from Rx to Tx, a case where the Rx timing is earlier (or differs from) by a specific offset value than the Tx timing.

That is, the RNs may receive offset values for timing matching from the parent nodes through configuration information (or control information), and the like, and calculate the TA based on signals transmitted from the parent nodes.

In this case, a signal for calculating the TA may be calculated based on a signal transmitted last.

Alternatively, the TA may be acquired through the signal transmitted from the parent node and the RNs may determine the transmission timing and the reception timing by using the acquired offset value and TA value.

Embodiment 1-2: Method in which RNs Match Timing Based on Synchronization Signal Transmitted from gNB The RNs receive the synchronization signal transmitted from the gNB to perform over-the-air (OTA) synchronization.

That is, the gNB may transmit the synchronization signal to synchronize with the RNs and the RNs may perform synchronization with the gNB based on the received synchronization signal, and the RNs may adjust the transmission timing and the reception timing based on the synchronization according to the synchronization signal transmitted from the gNB.

For example, each RN may synchronize with the gNB by performing downlink synchronization by receiving the synchronization signal transmitted by the gNB. The RN may configure the transmission timing and/or reception timing of the access link and/or the backhaul link (the backhaul link between the RN and the child node) based on synchronization with the gNB.

Accordingly, when the propagation delay occurs between the gNB and a specific RN, the slot boundary of the access link and/or the backhaul link of the RN may be delayed by the propagation delay value compared to the slot boundary of the access link of the gNB.

For example, when the gNB and the IAB RNs constitute the network as illustrated in FIG. 8, the propagation delay from gNB(a) to RN(x) may be referred to as P_ax. In this case, downlink timing Tx and/or uplink timing Rx of the access link and/or the backhaul link of the RN(x) may be delayed by P_ax compared with the downlink timing Tx and/or the uplink timing of the gNB as illustrated in FIG. 9(*b*).

That is, since the interference due to the propagation delay may occur between the gNB and the NR, the timing of the RN may be delayed by the propagation delay that occurs compared with the timing of the gNB.

In this case, in consideration of a time required for the relay node to switch from Rx to Tx, a case where the Rx timing is earlier (or differs from) by a specific offset value than the Tx timing.

That is, the RNs may receive offset values for timing matching from the parent nodes through configuration information (or control information), and the like, and calculate the TA based on signals transmitted from the parent nodes.

In this case, a signal for calculating the TA may be calculated based on a signal transmitted last.

Alternatively, the TA may be acquired through the signal transmitted from the parent node and the RNs may determine the transmission timing and the reception timing by using the acquired offset value and TA value.

Embodiment 1-3: Method in which RNs Match Timing Based on Synchronization Signal Transmitted from gNB Each of the RNs receives the synchronization signal transmitted from the parent node thereof to perform over-the-air (OTA) synchronization.

That is, the parent node may transmit the synchronization signal to synchronize with the RNs and the RNs may perform synchronization with the parent nodes based on the received synchronization signal, and the RNs may adjust the transmission timing and the reception timing based on the synchronization according to the synchronization signal transmitted from the parent node.

For example, each of the RNs may perform downlink synchronization by receiving the synchronization signal transmitted by the parent node thereof and configure the timing of the access link based on the performed downlink synchronization.

Accordingly, when there is the propagation delay between a specific RN and the parent node, the slot boundary of the access link of the corresponding RN may be delayed by a value of the propagation delay compared to the slot boundary of the access link of the parent node.

For example, when the gNB and the IAB RNs constitute the network as illustrated in FIG. 8, the propagation delay from RN(x) to RN(y) may be referred to as P_xy. In this case, when RN(x) is the parent node of RN(y), the downlink timing Tx and/or uplink timing Rx of the access link of the RN(y) may be delayed by P_xy compared with the downlink timing Tx and/or the uplink timing Rx of the RN(x) as illustrated in FIG. 9(*c*).

That is, since the interference due to the propagation delay may occur between the RN(x) which is the parent node and the RN(y) which is the child node, the timing of the RN(y) may be delayed by the propagation delay that occurs compared with the timing of the RN(x).

On the other hand, each of the RNs may perform synchronization by receiving the synchronization signal transmitted by the parent node thereof and configure the corresponding timing as uplink reception timing of the access link and/or backhaul link thereof. Furthermore, the RN may configure timing of applying the timing advance according to the reception timing of the parent node as downlink transmission timing of the access link and/or backhaul link operated by the RN.

In this case, the transmission timing and the reception timing of the RN may not be matched with each other.

In the embodiment, methods of configuring the timing between the links may be different. That is, in the access link and the backhaul link, the timing may be configured through different methods, respectively.

For example, the access link and the backhaul link may be TDMed for a specific node, and in the case of the access link, the timing may be configured by the method of Embodiment 1-1 or Embodiment 1-2. However, in the case of the backhaul link, the timing may be configured by the method of Embodiment 1-3. Alternatively, the timing for the backhaul link connected to the parent node may be configured in the method of Embodiment 1-3, but the timing for the backhaul link connected to the child node and the access link connected to the UE may be configured by the method of Embodiment 1-1 or 1-2.

<Embodiment 2_Configuring Transmission Timing and/or Reception Timing for IAB Nodes>

The transmission/reception timing for each link of the gNB and the RNs may be configured based on the following Rule.
- One node may perform both transmission and reception by considering the half-duplex characteristics.
- In order to reduce inter-link interference, the symbol boundaries of signals received by the RN through multiple links should be matched.
- In order to reduce the inter-link interference, the symbol boundaries of signals transmitted by the RN through multiple links should be matched.

Embodiment 2-1: Case of not Using TDM Method Between Access Link and Backhaul Link FIG. 10 is a diagram illustrating one example of transmission and reception states in each node when a Time Division Multiplexing (TDM) method is not used according to an embodiment of the present disclosure.

Figure 10:
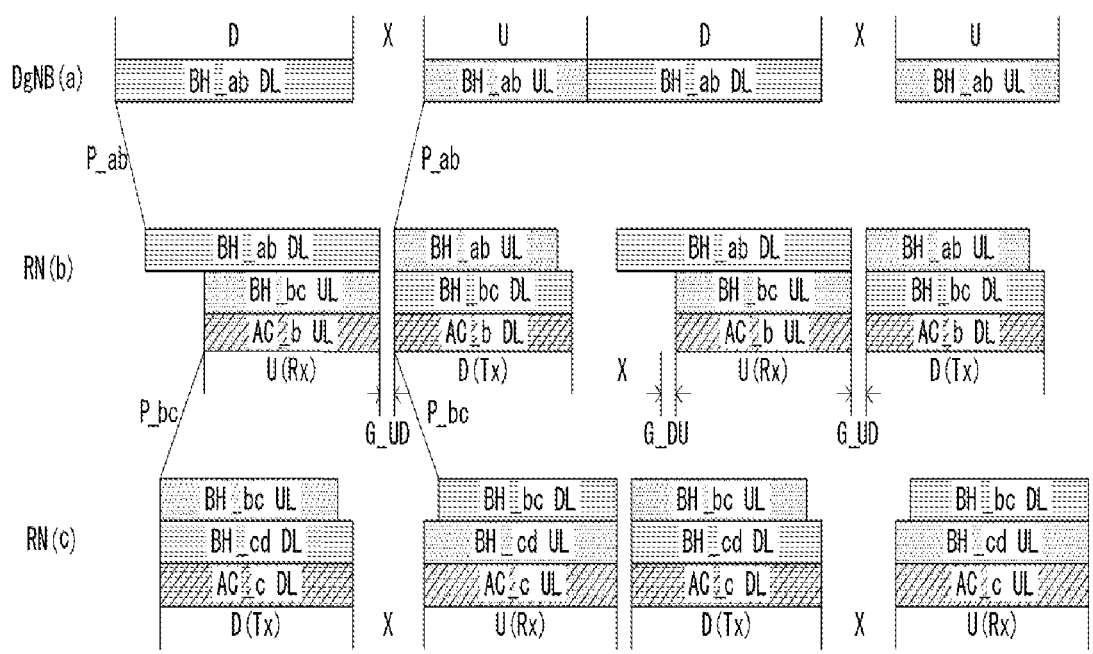
FIG. 10 is a diagram illustrating one example of transmission and reception states in each node when a Time Division Multiplexing (TDM) method is not used according to an embodiment of the present disclosure.

Referring to FIG. 10, when the access link and the backhaul link are multiplexed through the SDM or FDM method, the transmission timing and the reception timing of the child node may be the same as are the timing of receiving downlink data from the parent node and the timing of transmitting uplink data.

Specifically, the gNB and the RNs may simultaneously transmit and receive data by multiplexing the access link and the backhaul link through FDM and/or spatial division multiplexing (SDM).

For example, the RN may multiplex the access link and the backhaul link through the FDM or SDM method, transmit data to the UE through the access link, and receive data from another node through the backhaul link.

In this case, the reception timing for the backhaul link and/or the access link of the RN may be matched with the timing of performing downlink transmission from the parent node to the backhaul link. Furthermore, the transmission timing for the backhaul link and/or the access link of the RN may be matched with the timing of performing uplink transmission with the parent node through the backhaul link.

As illustrated in FIG. 10, the backhaul link between the RN(x) and the RN(y) may be referred to as BH_xy.

The RN(b) may receive downlink data transmitted by the gNB(a) through the backhaul link BH_ab. In this case, the RN(b) receives downlink data transmitted by gNB(a) through BH_ab at a time delayed by P_ab compared to the timing at which gNB(a) transmits the downlink data.

In addition, the RN(b) should transmit the uplink data to be transmitted to the gNB(a) through BH_ab in advance by P_ab in consideration of the propagation delay.

Considering the half-duplex characteristics of the nodes, when transmitting and receiving the downlink data through BH_ab so that the RN(b) may simultaneously transmit or receive the downlink data through BH_ab and BH_bc, the uplink data should be transmitted and received through BH_bc.

Alternatively, when the RN(b) transmits and receives the uplink data through BH_ab, the RN(b) should transmit and receive the downlink data through BH_bc.

In order to reduce cross-link interference of the RNs, it is preferable that the symbol boundaries of the signals simultaneously received or transmitted by the RN(b) through BH_ab and BH_bc are matched with each other.

Meanwhile, since the propagation delay value is not continuously a multiple of the symbol length, a gap may be required between uplink transmission and downlink transmission as illustrated in FIG. 10.

In FIG. 10, G_UD refers to a gap value required to meet the symbol boundary when switching from uplink to downlink, and G_DU refers to a gap value required to meet the symbol boundary when switching from downlink to uplink.

That is, when the RN changes the transmission method from uplink to downlink or from downlink to uplink, the gap may be inserted for a predetermined time (or interval) from the time when the uplink or downlink ends.

The values of G_DU and G_UD may be different for each RN.

In this case, the RN may be configured with the values of G_UD and/or G_DU from the parent node. That is, the RN may acquire at least one of the values of G_DU and/or G_UD through control information or configuration information transmitted from the parent node.

When the RN receives only one of the G_UD or G_DU value from the parent node, the RN may infer (or calculate) a value which is not configured through the configured value and the symbol length.

For example, when the RN is configured with only the value of G_UD from the parent node, the RN may infer or assume that the value obtained by subtracting the value of G_UD from the symbol length is the value of G_DU, and when the RN is configured with only the value of G_DU from the parent node, the RN may infer or assume that the value obtained by subtracting the value of G_DU from the symbol length is the value of G_UD.

In Embodiment 2-1, in consideration of a time required for the node to switch from reception to transmission or transmission to reception, a gap of a specific offset value may be required between the reception timing and the transmission timing.

Therefore, the value of G_UD or G_DU should be configured larger than the offset value, which is a time period required for the node to switch from reception to transmission. When a gap value required for matching the symbol boundary between uplink and downlink is smaller than an offset value, a value obtained by adding the symbol length to the corresponding gap value may be configured as the G_UD value. The same method may be applied even to G_DU.

When the method is used, a slot boundary may vary for each node. For each node, in each node, the slot boundary may be determined so that a time point at which the downlink starts in the access link and the backhaul link to the child node is located at the start point of the slot.

In the case of a single hop, the method has an advantage of efficiently using resources, but certain signaling or predefined operations may be required to match the resource formats of the RNs and the UEs.

For example, in FIG. 10, when the RN(b) receives the downlink data from gNB(a) through the backhaul link, the RN(b) may only receive the uplink data from a UE accessing the RN(b). Therefore, when the slot format of the backhaul link of the RN(b) is downlink, the slot format of the access link is uplink.

The following method may be used for matching the slot format of the RN.

(Method 1): When all of the slot boundaries of the RN and the UE are the same as each other, the RN may indicate an opposite format to the slot format received from the gNB to UEs accessing the RN. That is, when the slot format of the backhaul link is downlink, the slot format of the access link may be configured as uplink and when the slot format of the backhaul link is uplink, the slot format of the access link may be configured as downlink.

In this case, in the reserved part, the backhaul link and the access link may be configured identically, and scheduling for data transmission and reception may be flexibly performed according to a transmission/reception environment.

(Method 2): When the slot boundaries of the RN and the UE are not matched with each other, the RN may indicate the same format as the slot format received from the gNB to UEs accessing the RN. That is, when the slot format received from the gNB through the backhaul link is uplink, the RN may also configure the slot format of the access link as the same uplink thereas and when the slot format received from the gNB through the backhaul link is downlink, the RN may also configure the slot format of the access link as the same downlink thereas.

Figure 11:
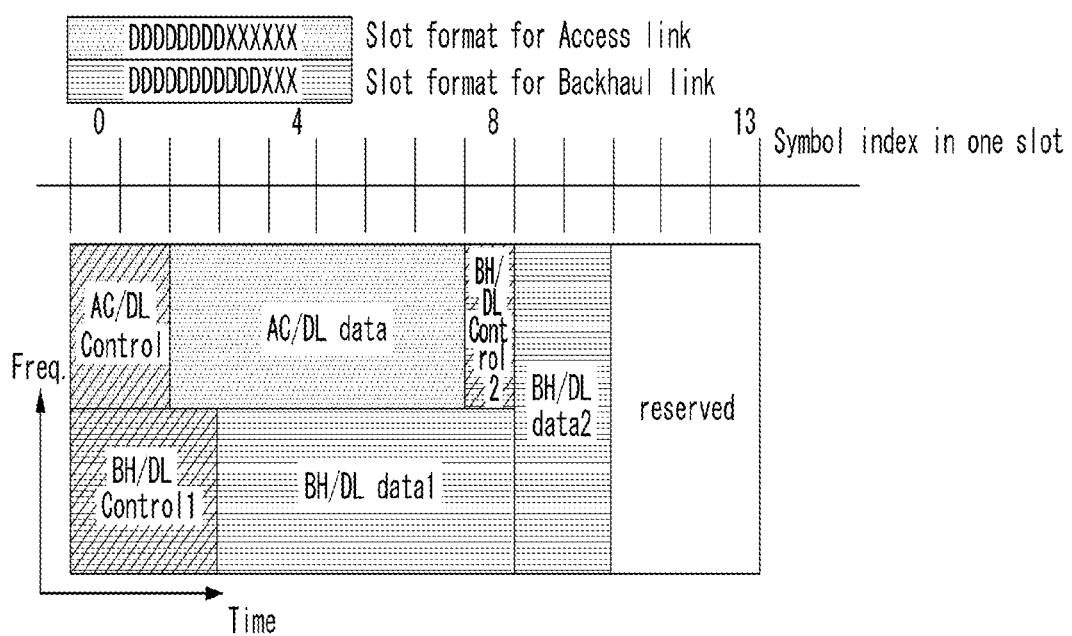
FIG. 11 is a diagram illustrating one example of resource scheduling for an access link and the backhaul link according to an embodiment of the present disclosure.

FIG. 11 is a diagram illustrating one example of allocating the same slot format to the access link and the backhaul link according to an embodiment of the present disclosure.

Referring to FIG. 11, when the slot boundary between the RN and the UE does not match as described in Method 2 above, the RN may configure the same format as the slot format received from the gNB in the access link.

Specifically, as illustrated in FIG. 11, when the slot boundaries of the RN and the UE do not match, the RN may also configure the access link of the UE to downlink when the slot format of the backhaul link is configured as downlink.

In this case, a slot start time point of the UE connected to the RN may have a certain offset compared to the slot start time point of the backhaul link, which may be related to the number of downlink resource symbols configured in the slot format of the backhaul link.

In the case of multi-hop, in the case of using the method, different slot formats should be configured for UEs accessing each RN, and when a UE connected to the RN(b) is receiving the downlink data, a UE connected to RN(c) may transmit the uplink data. Therefore, since a lot of interference between UEs may occur, resources should be allocated to the UEs in consideration of interference affecting the surroundings according to the locations of the UEs.

When the access link and the backhaul link are operated using in-band FDM in the gNB, it is necessary to accurately match each timing, and some of the resources allocated to the RN may not be used due to the long propagation delay of the backhaul link.

In this case, in order to efficiently use resources, the gNB may configure different slot formats for the access link and the backhaul link, respectively.

Figure 12:
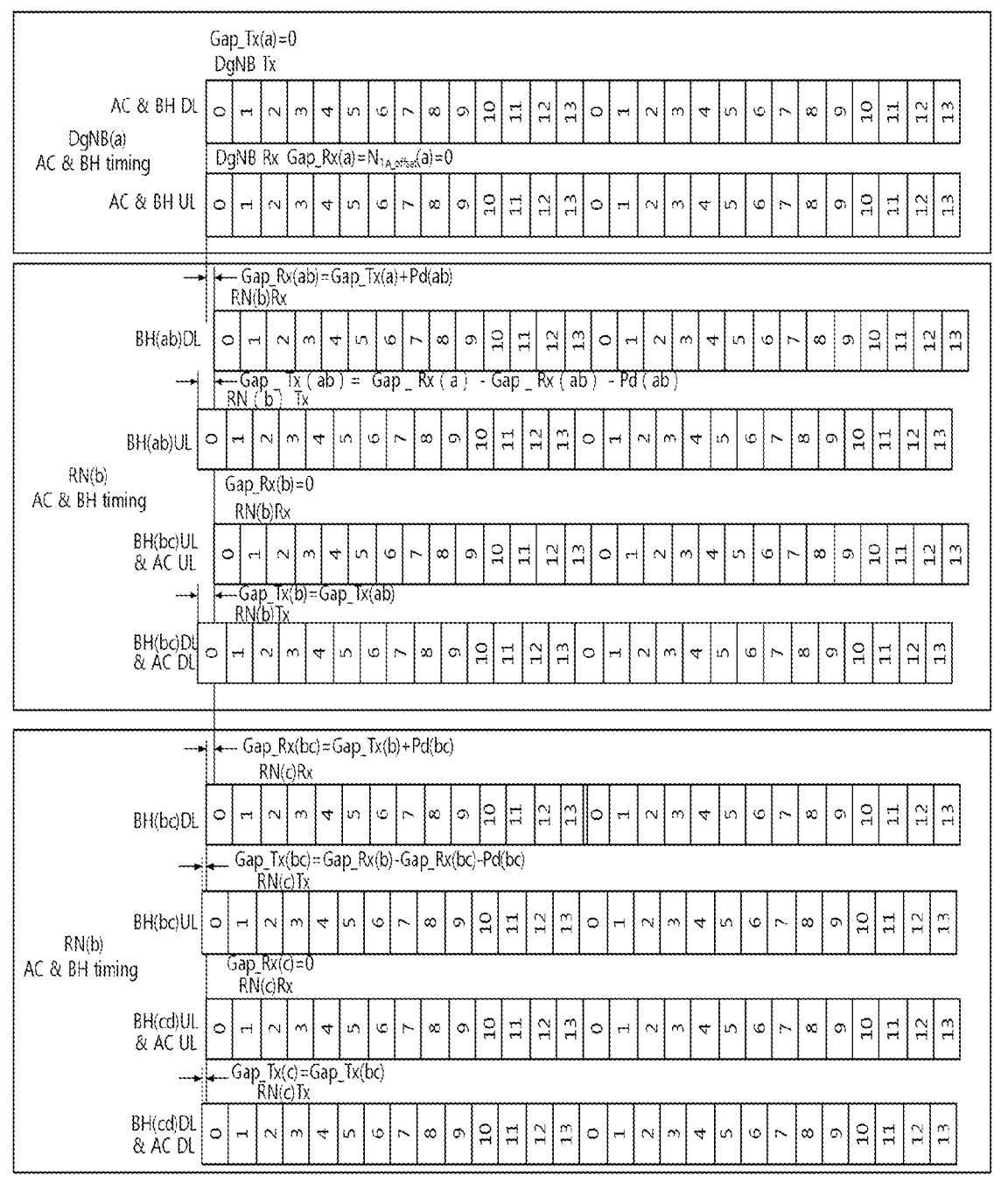

FIG. 12 is a diagram illustrating one example of timing of the access link and the backhaul link when the Time Division Multiplexing (TDM) method is not used according to an embodiment of the present disclosure.

Referring to FIG. 12, when the backhaul link and the access link are multiplexed through Non-TDM (e.g., FDM or SDM), the timing configuration of each RN may be made based on timing with the parent node.

Specifically, when the backhaul link and the access link are configured to be multiplexed through the Non-TDM method, the reception timing of the RN may be configured based on the link with the parent node, and the remaining timing may be configured based on the applied reception timing after the reception timing is applied.

That is, the transmission timing in the link with the parent node and the transmission timing and/or the reception timing in the link with the child node may be configured based on the corresponding node itself, and a specific configuration method is as illustrated in FIG. 12.

As illustrated in FIG. 12, since the gNB(a) does not have the parent node as a starting node, the timing may be configured based thereon. Therefore, both Gap_Rx(a) and Gap_Tx(a) may have a value of '0'.

Since the RN(b) is a node that may serve as both the parent node and the child node, when serving as the child node role, the configuring of each timing in the backhaul link with the gNB(a) may be shown in Equation 1 below.

$$Gap\_Rx(ab)=Gap\_Tx(a)+Pd(ab)$$ [Equation 1]

In addition, the Tx timing, which is the transmission timing, may be configured as shown in Equation 2 below based on the timing received by the RN(b).

$$Gap\_Tx(ab)=Gap\_Rx(a)-Gap\_Rx(ab)-Pd(ab)$$ [Equation 2]

In Equations 1 and 2, Pd(ab) may mean the propagation delay from the gNB(a), which is node a, to the RN(b), which is node b, which may be calculated through response timing of the parent node to a transmission signal thereof and the calculated value may be configured for the RN(b) which is the child node by the TA.

Alternatively, the child node may calculate the response timing of the parent node to the transmission signal thereof and apply the calculated the response timing to Pd(ab) and in this case, the child node may assume that the propagation delay value is not included in the TA value received from the parent node.

Alternatively, the parent node indicates whether the propagation delay value is included in the TA value through an indication to increase accuracy of timing configuration through a procedure in which the child node performs checking once again when the propagation delay value is included in the TA value.

When the RN(b) serves as the parent node, the value of Gap_Tx(b) may be equal to the value of Gap_Tx(ab) in the backhaul link with RN(c) and the value of Gap_Rx(b) may be equal to the value of Gap_Rx(b).

In addition, in terms of the RN(c), each timing may be calculated through Equation 3 below.

$$Gap\_Rx(bc)=Gap\_Tx(b)+Pd(bc) Gap\_Tx(bc)=Gap\_Rx(b)-Gap\_Rx(bc)-Pd(bc)$$ [Equation 3]

In summary, each child node y is configured with the value of Gap_Tx(x), the value of Gap_Rx(x), and the value of Pd(xy) from a parent node x thereof to accurately configure the transmission and/or reception timing when each child node y serves as the child node and when serving as the parent node.

When each node serves as the parent node, the timing is configured based on reception thereby, so the Gap(x) configured to the child node may be continuously configured to '0'.

In other words, the own node may be configured with the value of Gap_Tx(x) and the value of Pd(xy) from the parent node thereof and Gap_Rx(x) may be configured to '0'.

That is, the timing for one node(y) may be configured as follows.

Rx timing when serving as child node: Gap_Rx(xy)=Gap_Tx(x)+Pd(xy)

Tx timing when serving as child node: Gap_Tx(xy)=Gap_Rx(x)−Gap_Rx(xy)−Pd(xy)

Rx timing when serving as parent node: Gap_Rx(y)=0

Tx timing when serving as parent node: Gap_Tx(y)=Gap_Tx(xy)

Since the value of Gap_Tx(x) may be commonly configured in all nodes connected to one parent node in the equation described above, the value of Gap_Tx(x) may be transmitted by using common information or transmitted by using a resource specific to each node. Further, the value of Pd(xy) may also be transmitted by using the resource specific to the node.

Embodiment 2-2: Case of Using TDM Method Between Backhaul Link and Access Link

The access link and the backhaul link may be multiplexed through the TDM method. For example, in the gNB, the slot format may be configured for the UE, and data for the backhaul link may be scheduled in the reserved part.

In this case, the transmission timing and/or reception timing of the backhaul link may be configured based on the timing of the downlink signal received from the parent node, and the timing of the access link may be configured through three methods described in Embodiments 1-1 to 1-3.

That is, ① both the gNB and the RNs perform transmission/reception according to the absolutely identical slot boundary, ② match the timing of the RN based on the timing of receiving the downlink signal of the gNB, or ③ match the timing of the RN based on the timing of receiving the downlink signal of the parent node.

Hereinafter, each method will be described.

Embodiment 2-2-1: Method in which gNB and RNs are Configured at the Absolutely Identical Timing for Each Access Link FIG. 13 is a diagram illustrating one example of the transmission and reception states in each node when the Time Division Multiplexing (TDM) method is used according to an embodiment of the present disclosure.

Figure 13:
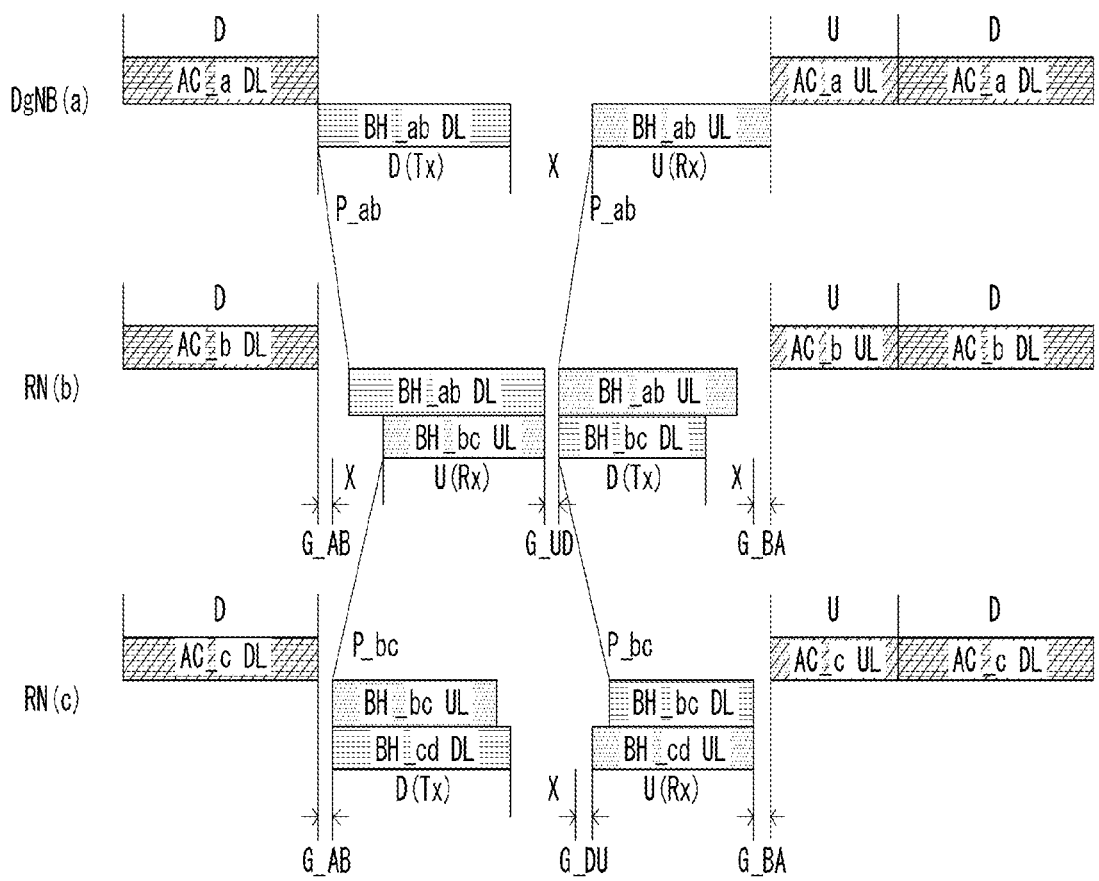
FIG. 13 is a diagram illustrating one example of the transmission and reception states in each node when the Time Division Multiplexing (TDM) method is used according to an embodiment of the present disclosure.

Referring to FIG. 13, both the gNB and the RNs may have absolutely the same access link timing, and thus perform transmission and reception of the backhaul link.

Specifically, sync of all access links may be consistent, and RNs for the access link may have the same transmission timing and/or reception timing. In this case, all UEs accessing each node may receive the same slot format, and transmission and reception of data through the backhaul link may be p performed in the reserved part of the slot format indication for the node to inform the UE of the slot format.

In the case of the backhaul link, child nodes may use downlink timing from the parent node, and as transmission timing, uplink timing of the parent node or separately configured timing may be used.

For example, as illustrated in FIG. 13, the RN(b) may receive a downlink signal of BH_ab transmitted by the gNB(a) at a time point delayed by P_ab from the timing at which the gNB(a) transmits the downlink signal, and should transmit an uplink signal of BH_ab transmitted to the gNB(a) at a time point by P_ab ahead of the timing at which the gNB(b) should receive the uplink signal.

In addition, it is necessary to match symbol boundaries between signals simultaneously transmitted or received by the RN, and accordingly, a certain gap needs to be configured (or inserted) between uplink transmission and downlink transmission of the backhaul link (e.g., G_UD and G_DU).

Furthermore, since the symbol boundary of the access link and the symbol boundary of the backhaul link do not coincide, a certain gap needs to be configured (or inserted) between transmission of the access link and transmission of the backhaul link as illustrated in FIG. 13.

G_AB denotes a gap value required to match the symbol boundaries when switching from the access link to the backhaul link and G_BA denotes a gap value required to match the symbol boundaries when switching from the backhaul link to the access link.

The value of the gap inserted while the link is switched may be different for each node RN.

The RN may be configured with G_AB and/or G_BA values from the parent node and may configure the G_AB and/or G_BA values configured for the child node.

In this case, the G_AB value may be continuously the same as the G_BA value, and only one gap value required for switching between the access link and the backhaul link may be configured from the parent node.

In Embodiment 2-2-1, even if a route of the backhaul link connecting the gNB and the RN is changed, the access link timing of the RN is not changed, so that the transmission/reception timing of the UE forming the connection with the RN may be maintained as it is.

In this case, a certain time is required for the node to switch from reception to transmission or transmission to reception, and in consideration of the time, a gap of a specific offset between the reception timing and the transmission timing is required. That is, in order to switch between the transmission operation and the reception operation of the UE, a minimum offset value should be inserted (or configured) between the transmission operation and the reception operation.

Therefore, the value of G_UD or G_DU should be configured to be larger than the offset value required for the node to switch from the reception operation to the transmission operation. When a gap value required for matching the symbol boundary between uplink and downlink is smaller than an offset value, a value obtained by adding the symbol length to the corresponding gap value may be configured as the G_UD value and the value of G_DU may also be configured by the same method.

In other words, in an environment where the backhaul link and the access link are multiplexed through the TDM method, the downlink slot boundary for the access link of all UEs connected to the same gNB or RNs connected to the gNB may be matched based on the gNB and the uplink slot boundary may be advanced by a specific offset value, $N_{TA\_offset}$, than the downlink.

The UEs may calculate the transmission timing by summing $N_{TAoffset}$ to $N_{TA}$, which is a TA value configured from the gNB or the RN.

That is, when the backhaul link and the access link are multiplexed through the TDM method, the downlink timing for the access link among the gNB, the RN, and the UEs may all be configured to the absolute same value according to the timing of the gNB, and the boundary of the uplink slot may be advanced by a predetermined value from the boundary of the downlink slot.

In this case, the UE may calculate the transmission timing based on the TA value and the offset value transmitted through the configuration information from the gNB or RN.

In such an environment, in relation to the configuration of the timing between backhaul links, each node may have $N_{TA\_offset}$, which is each offset value in serving as the parent node, and calculates $N_{TA}$, which is a TA value for nodes accessing each node to configure $N_{TA}$ for each node through the configuration information.

In configuring $N_{TA\_offset}$, ① $N_{TA\_offset}$ may be configured to a fixed value and preconfigured for the UE and the nodes, ② acquired from the gNB through the configuration information, or ③ each node may directly configure $N_{TA\_offset}$ by calculating the propagation delay with the gNB while constructing the backhaul link.

In other words, the parent node gNB or RN may transmit to the child node or the UE through indication information including $N_{TA\_offset}$ (or T0) as a timing offset value. When the RN or the UE, which is an IAB node, receives the timing offset value from the parent node through the indication information, the RN or the UE may trigger downlink transmission timing adjustment thereof.

The DL TX timing adjustment may be performed by the TA value or TO value, and the TA value may be calculated based on a signal most recently transmitted from the parent node.

That is, when the UE acquires the timing offset value from the parent node, the UE may calculate the downlink transmission timing based on the TA value and the transmitted timing offset value.

Equation 4 shows a method for calculating the DL TX timing based on the TA value and the transmitted timing offset value.

$$DL\ TX\ timing = TA/2 + T0 \qquad \text{[Equation 4]}$$

Figure 14:
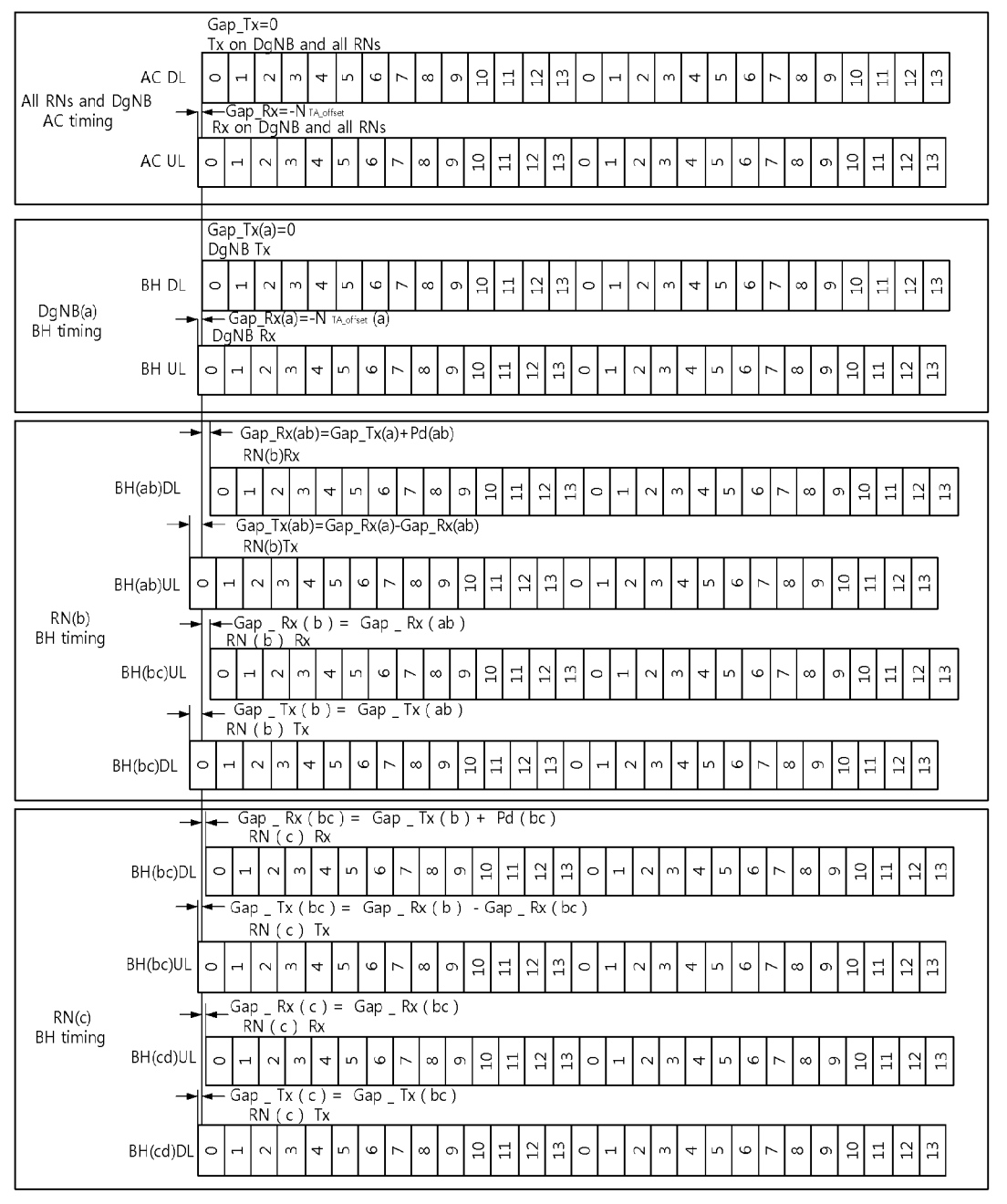

FIG. 14 is a diagram illustrating one example of the timing of the access link and the backhaul link when the Time Division Multiplexing (TDM) method is used according to an embodiment of the present disclosure.

FIG. 14 illustrates a specific embodiment of the method described in FIG. 13. Referring to FIG. 14, since all RNs are in absolute timing with the gNB, access link timings of all UEs connected to the corresponding gNB and RNs are also similarly configured based on the gNB.

That is, Gap_Tx which is a gap of the transmission timing for the access link in all RNs and gNB is '0' and Gap_Rx which is a gap of the reception timing is $-N_{TA\_offset}$.

The value of the timing Gap_Tx(a) of the backhaul link connected to the gNB(a) from the gNB side may be '0', and the value of Gap_Rx(a) may be $-N_{TA\_offset}(a)$.

In this case, a negative value indicates a timing that is advanced from a reference point and a positive value indicates a timing that is pushed back from the reference point.

In the backhaul link of the RN(b), Gap_Rx(ab) may be expressed as in Equation 5 below, and Gap_Tx(ab) may be expressed as in Equation 6.

$$Gap\_Rx(ab) = Gap\_Tx(a) + Pd(ab) \qquad \text{[Equation 5]}$$

$$Gap\_Tx(ab) = Gap\_Rx(a) - Gap\_Rx(ab) \qquad \text{[Equation 6]}$$

In Equations 5 and 6, Pd(ab) may denote a propagation delay from the gNB(a), which is node a to RN(b), which is node b, and may be configured in the same method as described in Embodiment 2-1.

In the backhaul link between the RN(b) and the RN(c), Gap_Tx(b) of the RN(b) is the same as Gap_Tx(ab), and Gap_Rx(b) is the same as Gap_Rx(ab).

In the RN(c), Gap_Rx(bc) may be expressed as in Equation 7 below, and Gap_Tx(bc) may be expressed as in Equation 8 below.

$$Gap\_Rx(bc) = Gap\_Tx(b) + Pd(bc) \qquad \text{[Equation 7]}$$

$$Gap\_Tx(bc) = Gap\_Rx(b) - Gap\_Rx(bc) \qquad \text{[Equation 8]}$$

In summary, each child node y is configured with the value of Gap_Tx(x) and the value of Gap_Rx(x) from the parent node x thereof to accurately configure the transmission and/or reception timing when each child node y serves as the child node and when serving as the parent node.

For example, the timing for node(y) may be configured according to each role as follows.

Rx timing when serving as child node: Gap_Rx(xy)=Gap_Tx(x)+Pd(xy)
Tx timing when serving as child node: Gap_Tx(xy)=Gap_Rx(x) −Gap_Rx(xy)
Rx timing when serving as parent node: Gap_Rx(y)=Gap_Rx(xy)
Tx timing when serving as parent node: Gap_Tx(y)=Gap_Tx(xy)

Since the value of Gap_Tx(x) and the value of Gap_Rx(x) may be commonly configured to all nodes or UEs connected to one parent node as described above, the value of Gap_Tx(x) and the value of Gap_Rx(x) may be transmitted through the same information or transmitted through a resource specific to the node or UE (node(UE)-specific resource).

The value of Pd(xy) may be transmitted similarly as the value of Gap_Tx(x).

Embodiment 2-2-2: Case of being Delayed by Propagation Delay Based on gNB

For the timing of the access link, each RN may perform OTA synchronization using the SSB of the gNB, and the timing may be configured based on the performed synchronization.

For example, each RN may receive the synchronization signal transmitted by the gNB and perform synchronization by using the received synchronization signal. Thereafter, each RN may configure the transmission timing and/or reception timing of the access link by using the synchronization.

When there is the propagation delay between the gNB and a specific RN, the slot boundary of the access link of the RN may be delayed from the slot boundary of the access link of the gNB by the propagation delay value and in the case of the backhaul link, the timing may be configured as in Embodiment 2-2-1.

Embodiment 2-2-3: Case of Keeping Slot Boundary Based on Parent Node

In order to configure the timing of the access link, each RN may match the synchronization of the access link by using the SS of the parent node accessed by each RN. For example, after each RN receives the synchronization signal transmitted from the parent node, each RN may perform the synchronization using the received synchronization signal and configure the synchronization at the transmission timing and/or reception timing of the access link.

When there is the propagation delay between the parent node and a specific RN, the slot boundary of the access link of the RN may be delayed by a value of the propagation delay compared to the slot boundary of the access link of the parent node.

In the case of the backhaul link, the timing may be configured as in Embodiment 2-2-1.

<Embodiment 2-3_TDM Method Between UE Function and gNB Function>

Figure 15:
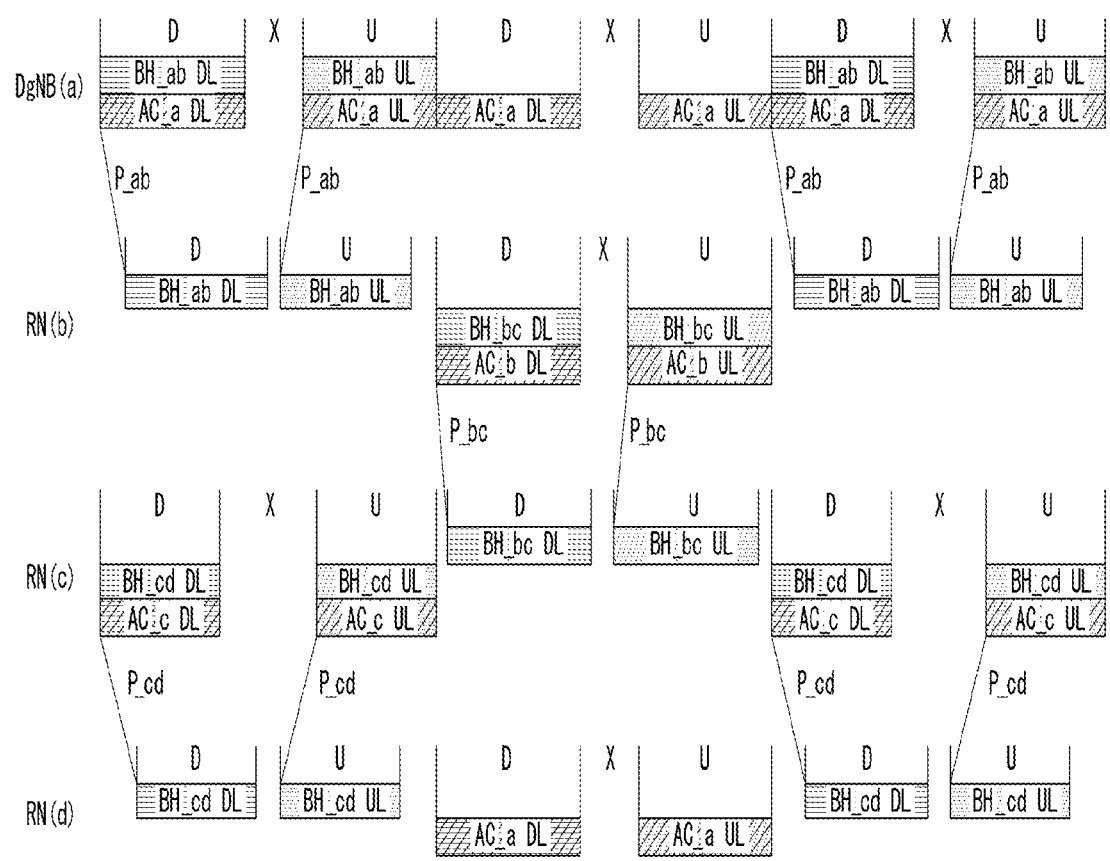
FIG. 15 is a diagram illustrating another example of the transmission and reception states in each node when the Time Division Multiplexing (TDM) method is used according to an embodiment of the present disclosure.

FIG. 15 is a diagram illustrating another example of the transmission and reception states in each node when the Time Division Multiplexing (TDM) method is used according to an embodiment of the present disclosure.

①When there is a backhaul link connecting the RN and the parent node, ②when there is a backhaul link connecting the RN and the child node, and ③when there is an access link connecting the RN and the UE, ① and ②+③ may be multiplexed through the TDM method.

That is, a time period in which the RN performs the UE function and a time period in which the RN performs the base station function may be multiplexed through the TDM method. For example, in the case of the backhaul link connected to the parent node as illustrated in FIG. 15, the reception timing may be configured to the downlink timing from the parent node and the transmission timing may be configured to the uplink timing of the parent node or timing through a separate configuration.

The RN(b) may receive a downlink signal of BH_ab transmitted by the gNB(a) at a time point delayed by P_ab from the timing at which the gNB(a) transmits the downlink signal, and an uplink signal of BH_ab transmitted to the gNB(a) may be transmitted at a time point by P_ab ahead of the timing at which the gNB(b) should receive the uplink signal.

On the other hand, in the case of the access link in which the RN is connected to the UE and the backhaul link connected to the child node, the method of Embodiment 1-1 or 1-2 described in Embodiment 1 may be applied. That is, in the RNs, transmission timing and/or reception timing may be configured, which are/is independent from the transmission timing and/or the reception timing with the parent node.

For example, the gNB and the RNs for the links may have absolutely the same transmission timing and/or reception timing.

In order to apply the method, during a period (or time) in which the parent node performs transmission and reception by the link of ①, the child node may perform transmission and reception by the links of ②+③ and in a period (or time) in which the parent node performs transmission and reception by the links of ②+③, the child node may perform transmission and reception by the link of ①.

In the case of the gNB, since there is no parent node, the link of ① is not present. Accordingly, the transmission and reception may be performed instead through the access link during the time period in which the transmission and reception is performed by the link of ①.

In order for the RN to switch from the reception period to the transmission period or from the transmission period to the reception period, a certain time is required and a gap of a specific offset is required between the reception timing and the transmission timing by considering such a time. That is, in order to switch between the transmission operation and the reception operation of the UE, a minimum offset value should be inserted (or configured) between the transmission operation and the reception operation.

Therefore, the value of G_UD or G_DU should be configured to be larger than the offset value required for the node to switch from the reception operation to the transmission operation. When a gap value required for matching the symbol boundary between uplink and downlink is smaller than an offset value, a value obtained by adding the symbol length to the corresponding gap value may be configured as the G_UD value and the value of G_DU may also be configured by the same method.

In other words, in an environment where the backhaul link and the access link are multiplexed through the TDM method, the downlink slot boundary for the access link of all UEs connected to the same gNB or RNs connected to the gNB may be matched based on the gNB and the uplink slot boundary may be advanced by a specific offset value, $N_{TA\_offset}$, than the downlink.

<Embodiment 2-3_Selective Synchronization Configuring Method>

Figure 16:
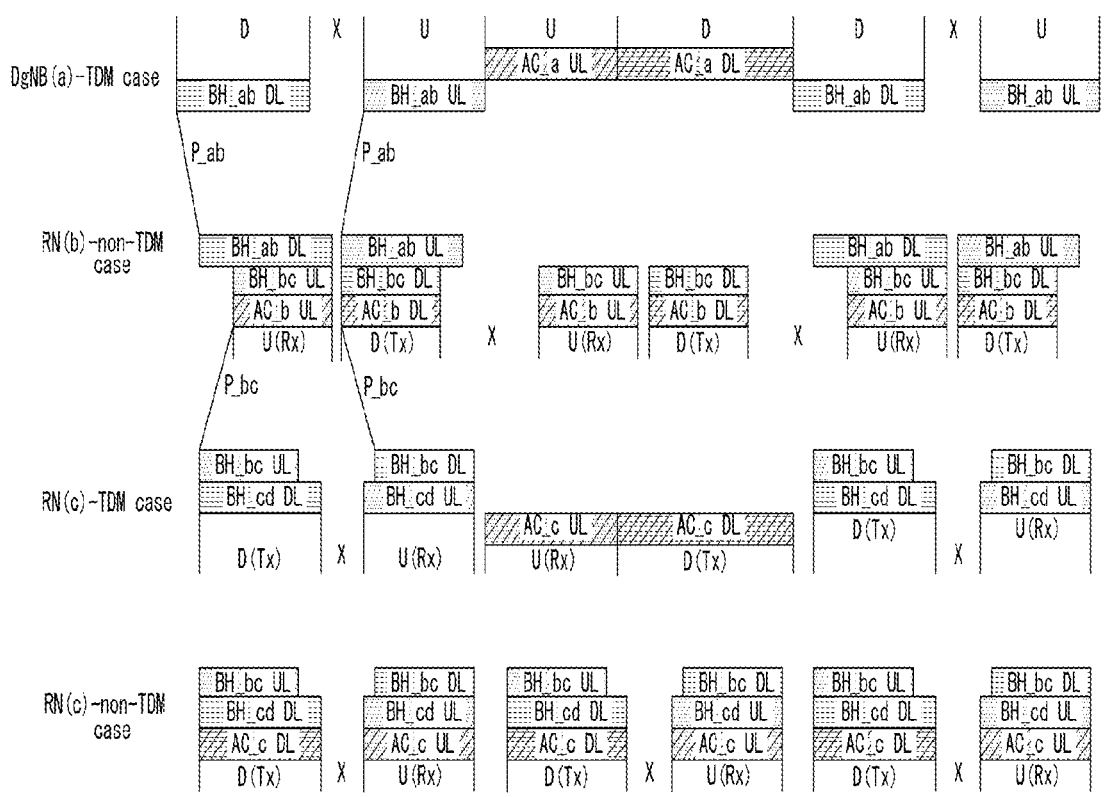
FIG. 16 is a diagram illustrating one example of yet another example of the transmission and reception states in each node according to an embodiment of the present disclosure.

FIG. 16 is a diagram illustrating one example of yet another example of the transmission and reception states in each node according to an embodiment of the present disclosure.

A method applied for configuring the timing may be different for each RN. For example, each RN may determine a method for configuring the timing of a timing configuring method when the backhaul link and the access link of Embodiment 2-1 are multiplexed through a non-TDM method and a timing configuring method when the backhaul link and the access link of Embodiment 2-2 are multiplexed through the TDM method.

For example, as illustrated in FIG. 16, in the gNB, the timing may be configured through a timing configuring method when multiplexed through the TDM and in the RN(b), the timing may be configured through a timing configuring method when multiplexed through the non-TDM method. FIG. 15 illustrates all slot formats when the timing is configured through the timing configuring method when multiplexed through the TDM and the timing configuring method when multiplexed through the non-TDM method.

In order to applying different timing configuring methods according to the RN as described above, the following conditions (or restrictions) may be required.

A time period of performing the transmission and reception through the backhaul link and a time period of performing the transmission and reception through the access link should be the same as each other.

When the transmission timing and/or the reception timing are configured through such a method, a time period during which the parent node may perform transmission and reception to the child node through the backhaul link may vary according to the timing configuring method of the child node.

Therefore, the child node should transmit information related to the timing configuring method used thereby to the parent node thereof.

In other words, the child node should inform the parent node of which method a method in which the child node uses for configuring the timing is and a time period in which the parent node may perform the transmission and reception through the backhaul link may vary according to the timing configuring method used by the child node.

<Embodiment 2-5_Extended CP for Backhaul Link>

The transmission timing and/or the reception timing between the RNs need to be operated differently due to the propagation delay for the backhaul link. However, even if there is the propagation delay, a long CP (extended CP) may be applied to the backhaul link in order to prevent the transmission timing and/or transmission timing of the RNs from being shifted.

The CP length may vary between the access link and the backhaul link, and this may be applied when the access link and the backhaul link are multiplexed through the TDM method and when "out-band FDM" is performed.

When the access link and the backhaul link are subjected to 'in-band' TDM, the extended CP may be applied to both the access link and the backhaul link, but it is not efficient to use resources when resources for the UE are scheduled in the same slot or symbols.

As another method, the extended CP may be dynamically indicated to the backhaul link. The gNB may calculate a delay time of a signal received from the RN, determine whether there is an effect on data transmission/reception when a normal CP is applied to the corresponding RN, and set the type of the CP to the RN.

In this case, the gNB may divide RNs connected to the gNB into two groups, and schedule RNs using a general CP in one time range and RNs using the extended CP in one time range.

<Embodiment 2-6_Dynamic Switching Among Different Backhaul Links in Multiple Hops>

Figure 17:
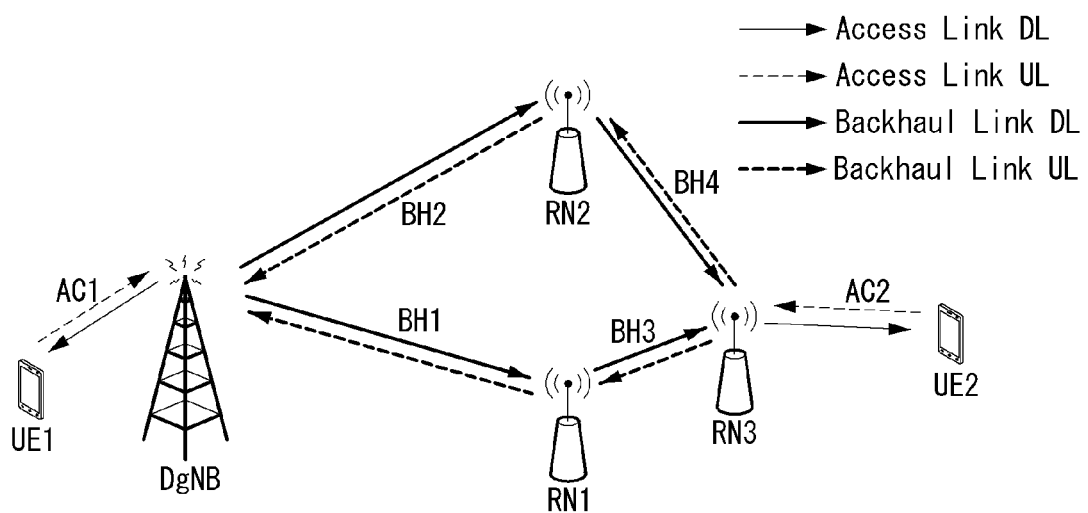
FIG. 17 is a diagram illustrating one example of signal transmission in multiple hops according to an embodiment of the present disclosure.

FIG. 17 is a diagram illustrating one example of signal transmission in multiple hops according to an embodiment of the present disclosure. FIG. 17 illustrates a process in which the UE performs communication with the network through multi-hop RNs. When the parent node of the RN of the access link is changed, the propagation delay of a multi-hop path is changed, and as a result, the synchronization of the access link of the corresponding RN may also be changed.

In a dynamic topology adaptation situation, if there are frequent timing alignment and scheduling-related changes, problems such as interference between nodes, miss catch, etc., may occur, and as a result, it may be difficult for the RN to dynamically synchronize with the parent node.

In this case, the RN may synchronize with the parent node through the following methods.

(Method 1): The current parent node may indicate the transmission timing and/or reception timing of the child node and configure the time during which the corresponding backhaul link may be used for the RN semi-statically. When the child node may perform data transmission/reception using a plurality of backhaul links, the corresponding child node may be semi-statically configured with transmission timing and/or reception timing from accessible parent nodes, and the corresponding child node may perform communication with the parent nodes by changing the transmission timing and/or the reception timing in units of a configured period.

For example, as illustrated in FIG. 17, RN 3 may be the child node, and RN 1 and RN 2 may be the parent nodes of RN 3.

RN 3 may be indicated with different transmission timings and/or reception timings from RN 1 and RN 2, respectively, and a period in which each corresponding backhaul link may be used may also be configured together.

In this case, RN 3 may perform data transmission/reception through different backhaul links by changing the transmission timing and/or reception timing in units of a set period.

(Method 2): The current parent node may indicate a transmission timing and/or a reception timing at which the child node may perform communication from the next new parent node. For example, as illustrated in FIG. 17, when RN 3 performs data transmission/reception through the backhaul to/from with RN 1, RN 3 having a new transmission timing and/or reception timing configured to RN 1 may transmit and receive data to and from RN 2 through the backhaul link by using a new timing value at a predetermined time.

In this case, the time at which the new timing is applied may be preconfigured or be indicated together when a new transmission timing and/or reception timing is configured.

That is, information related to the timing at which the new timing is applied may be included in the configuration information for configuring the new transmission timing and/or the reception timing and transmitted to the child node.

(Method 3): When the symbol boundaries of the switched backhaul links are identical (the slot boundaries may be different), if the delay of the switched backhaul link is longer, the RN may recognize that data is simply received late without tuning of the reception timing. However, it is necessary to advance the transmission time point of transmission data through tuning or scheduling of the transmission timing.

Even when the backhaul link between IAB nodes is wirelessly configured in a single-hop or multi-hop situation through the first and second embodiments, the timing may be configured by matching the slot boundaries.

Figure 18:
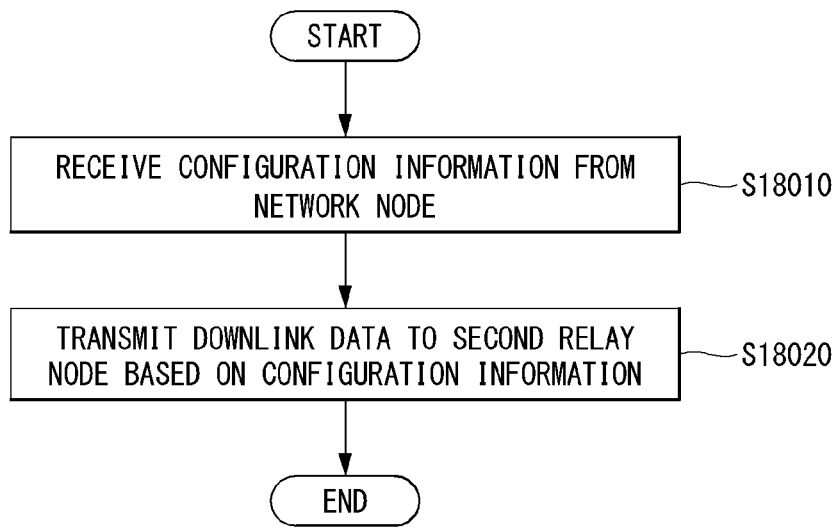
FIG. 18 is a flowchart illustrating one example for a method for determining transmission and reception timing by a relay node according to an embodiment of the present disclosure.

FIG. 18 is a flowchart illustrating one example for a method for determining transmission and reception timing by a relay node according to an embodiment of the present disclosure.

Referring to FIG. 18, the relay node may configure transmission timing and/or reception timing using an offset value transmitted from a base station.

Specifically, a first relay node performing an IAB function may receive configuration information from a network node (S18010).

In this case, the configuration information may include a timing offset value described in the first and second embodiments in order for the first relay node to configure the transmission timing and/or the reception timing.

Thereafter, the first relay node may transmit downlink data to a second relay node based on the configuration information (S18020).

In this case, the transmission timing of the downlink data may be determined based on the timing offset and a timing advance (TA) through the method described in Embodiments 1 to 2 above.

That is, the transmission timing may be configured when the first relay node receives the timing offset value for configuring timing from the parent node and determined based on a timing advance value.

Furthermore, the first relay node may calculate the timing advance value based on a signal most recently transmitted from the parent node.

Even when a backhaul link is wirelessly connected between relay nodes by using such a method, the transmission timing and/or the reception timing may be configured by matching slot boundaries.

Figure 19:
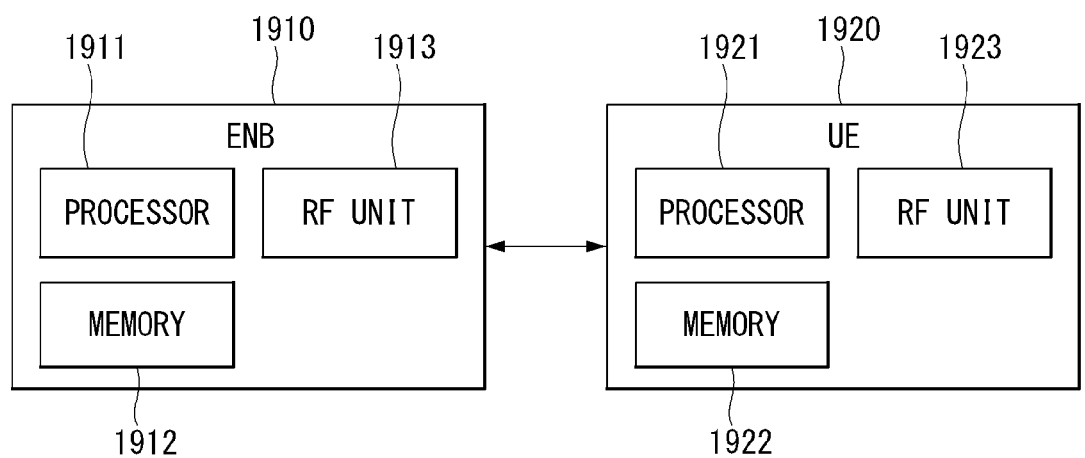
FIG. 19 is a block diagram of a wireless communication device to which methods proposed in the present disclosure may be applied.
Figure 20:
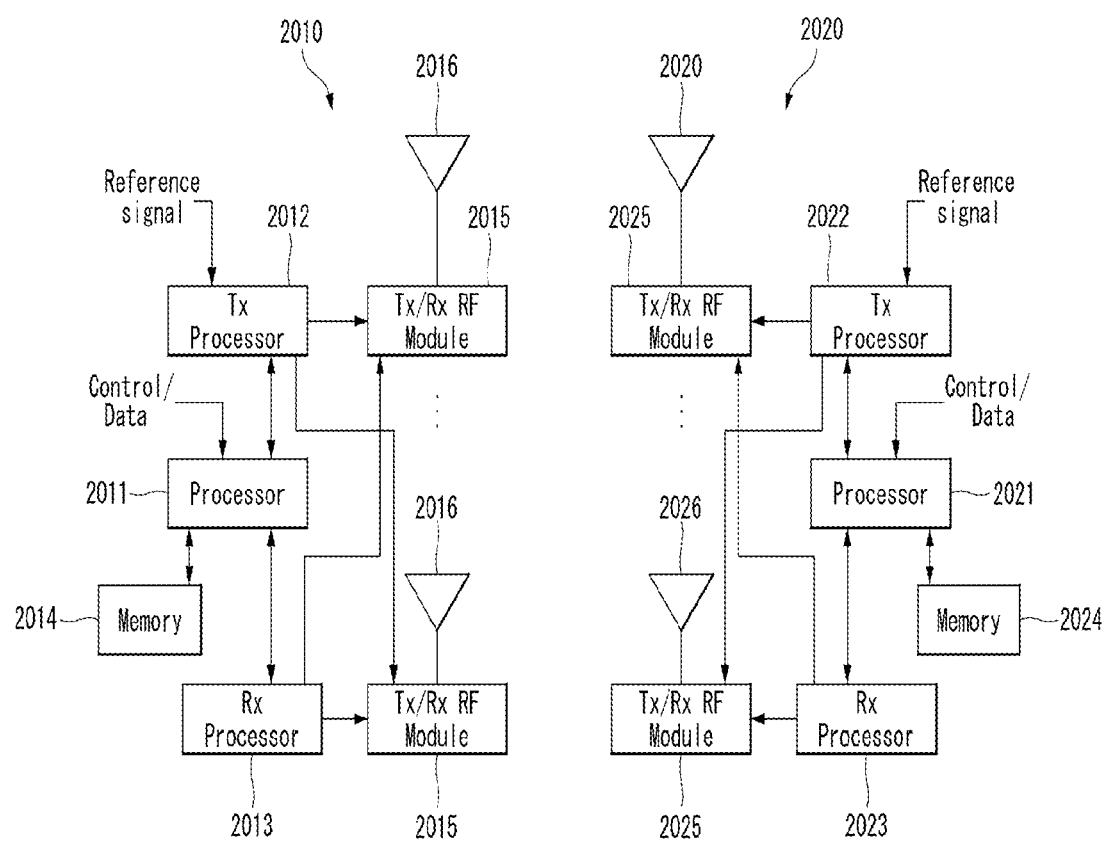
FIG. 20 illustrates another example of the block diagram of a wireless communication device to which the methods proposed in the present disclosure may be applied.

In this regard, the operation of the UE described above may be specifically implemented by UE devices 1920 and 2020 illustrated in FIGS. 19 and 20 of the present disclosure. For example, the operation of the UE described above may be performed by processors 1921 and 2021 and/or RF units (or modules) 1923 and 2025.

Specifically, the processors 1921 and 2021 may control to receive configuration information from the network node through the RF units (or modules) 1923 and 2025.

In this case, the configuration information may include a timing offset value described in the first and second embodiments in order for the first relay node to configure the transmission timing and/or the reception timing.

Thereafter, the processors 1821 and 1921 may control to transmit downlink data based on the configuration information through the RF units (or modules) 1723 and 1825.

In this case, the transmission timing of the downlink data may be determined based on the timing offset and a timing advance (TA) through the method described in Embodiments 1 to 2 above.

That is, the transmission timing may be configured when the first relay node receives the timing offset value for configuring timing from the parent node and determined based on a timing advance value.

Furthermore, the first relay node may calculate the timing advance value based on a signal most recently transmitted from the parent node.

General Apparatus to which the Present Disclosure May be Applied

FIG. 19 illustrates a block diagram of a wireless communication apparatus to which methods proposed in the present disclosure may be applied.

Referring to FIG. 19, a wireless communication system includes a BS 1910 and multiple UEs 1920 located within a BS area.

The BS and the UE may be represented as respective wireless apparatuses.

In this case, the BS 1910 and the UE 1920 may be referred to as a first device or a second device.

The first device is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), and AI. (Artificial Intelligence) modules, robots, Augmented Reality (AR) devices, Virtual Reality (VR) devices, Mixed Reality (MR) devices, hologram devices, public safety devices, MTC devices, IoT devices, medical devices, fintech devices (or Financial devices), security devices, climate/environment devices, devices related to 5G services, or other devices related to the 4th industrial revolution field.

The second device includes a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), AI (Artificial Intelligence) modules, robots, Augmented Reality (AR) devices, Virtual Reality (VR) devices, Mixed Reality (MR) devices, hologram devices, public safety devices, MTC devices, IoT devices, medical devices, fintech devices (Or financial devices), security devices, climate/environment devices, devices related to 5G services, or other devices related to the 4th industrial revolution field.

For example, the terminal is a mobile phone, a smart phone, a laptop computer, a digital broadcasting terminal, a personal digital assistants (PDA), a portable multimedia player (PMP), a navigation system, a slate PC, and a tablet. PC (tablet PC), ultrabook (ultrabook), wearable device (wearable device, for example, a watch-type terminal (smartwatch), glass-type terminal (smart glass), HMD (head mounted display)), and the like may be included. For example, the HMD may be a display device worn on the head. For example, HMD can be used to implement VR, AR or MR.

For example, a drone may be a vehicle that is not a human being and is flying by a radio control signal. For example, the VR device may include a device that implements an object or a background of a virtual world. For example, the AR device may include a device that connects and implements an object or background of a virtual world, such as an object or background of the real world. For example, the MR device may include a device that combines and implements an object or background of a virtual world, such as an object or background of the real world. For example, the hologram device may include a device that implements a 360-degree stereoscopic image by recording and reproducing stereoscopic information by utilizing an interference phenomenon of light generated when two laser lights meet, called holography. For example, the public safety device may include an image relay device or an image device wearable on a user's human body. For example, the MTC device and the IoT device may be devices that do not require direct human intervention or manipulation. For example, the MTC device and the IoT device may include a smart meter, a bending machine, a thermometer, a smart light bulb, a door lock, or various sensors. For example, the medical device may be a device used for the purpose of diagnosing, treating, alleviating, treating or preventing a disease. For example, the medical device may be a device used for the purpose of diagnosing, treating, alleviating or correcting an injury or disorder. For example, a medical device may be a device used for the purpose of examining, replacing or modifying a structure or function. For example, the medical device may be a device used for the purpose of controlling pregnancy. For example, the medical device may include a device for treatment, a device for surgery, a device for diagnosis (extra-corporeal), a device for hearing aids or a procedure. For example, the security device may be a device installed to prevent a risk that may occur and maintain safety. For example, the security device may be a camera, CCTV, recorder, or black box. For example, the fintech device may be a device capable of providing financial services such as mobile payment. For example, the fintech device may include a payment device or a point of sales (POS). For example, the climate/environment device may include a device that monitors or predicts the climate/environment.

The BS 1910 includes a processor 1911, a memory 1912 and a radio frequency (RF) module 1913. The processor 1911 implements the functions, processes and/or methods proposed with reference to FIGS. 1 to 18 and embodiment 1 and 2. The layers of a radio interface protocol may be implemented by the processor. The memory is coupled to the processor and stores various pieces of information for driving the processor. The RF module is coupled to the processor and transmits and/or receives radio signals.

The UE includes a processor 1921, a memory 1922 and an RF module 1923.

The processor implements the functions, processes and/or methods proposed with reference to FIGS. 1 to 18 and embodiment 1 and 2. The layers of a radio interface protocol may be implemented by the processor. The memory is coupled to the processor and stores various pieces of information for driving the processor. The RF module 1923 is coupled to the processor and transmits and/or receives radio signals.

The memory 1912, 1922 may be inside or outside the processor 1911, 1921 and may be coupled to the processor by various well-known means.

Furthermore, the BS and/or the UE may have a single antenna or multiple antennas.

FIG. 20 is another example of a block diagram of the wireless communication apparatus to which methods proposed in the present disclosure may be applied.

Referring to FIG. 20, a wireless communication system includes a BS 2010 and multiple UEs 2020 disposed within the BS region. The BS may be represented as a transmission device, and the UE may be represented as a reception device, and vice versa. The BS and the UE include processors 2011 and 2021, memories 2014 and 2024, one or more Tx/Rx radio frequency (RF) modules 2015 and 2025, Tx processors

2012 and 2022, Rx processors 2013 and 2023, and antennas 2016 and 2026, respectively. The processor implements the above-described functions, processes and/or methods. More specifically, in DL (communication from the BS to the UE), a higher layer packet from a core network is provided to the processor 2011. The processor implements the function of the L2 layer. In DL, the processor provides the UE 2020 with multiplexing between a logical channel and a transport channel and radio resource allocation, and is responsible for signaling toward the UE. The TX processor 2012 implements various signal processing functions for the L1 layer (i.e., physical layer). The signal processing function facilitates forward error correction (FEC) in the UE, and includes coding and interleaving. A coded and modulated symbol is split into parallel streams. Each stream is mapped to an OFDM subcarrier and multiplexed with a reference signal (RS) in the time and/or frequency domain. The streams are combined using inverse fast Fourier transform (IFFT) to generate a physical channel that carries a time domain OFDMA symbol stream. The OFDM stream is spatially precoded in order to generate multiple space streams. Each of the space streams may be provided to a different antenna 2016 through an individual Tx/Rx module (or transmitter and receiver 2015). Each Tx/Rx module may modulate an RF carrier into each space stream for transmission. In the UE, each Tx/Rx module (or transmitter and receiver 2025) receives a signal through each antenna 2026 of each Tx/Rx module. Each Tx/Rx module restores information modulated in an RF carrier and provides it to the RX processor 2023. The RX processor implements various signal processing functions of the layer 1. The RX processor may perform space processing on information in order to restore a given space stream toward the UE. If multiple space streams are directed toward the UE, they may be combined into a single OFDMA symbol stream by multiple RX processors. The RX processor converts the OFDMA symbol stream from the time domain to the frequency domain using fast Fourier transform (FFT). The frequency domain signal includes an individual OFDMA symbol stream for each subcarrier of an OFDM signal. Symbols on each subcarrier and a reference signal are restored and demodulated by determining signal deployment points having the best possibility, which have been transmitted by the BS. Such soft decisions may be based on channel estimation values. The soft decisions are decoded and deinterleaved in order to restore data and a control signal originally transmitted by the BS on a physical channel. A corresponding data and control signal are provided to the processor 2021.

UL (communication from the UE to the BS) is processed by the BS 2010 in a manner similar to that described in relation to the receiver function in the UE 2020. Each Tx/Rx module 2025 receives a signal through each antenna 2026. Each Tx/Rx module provides an RF carrier and information to the RX processor 2023. The processor 2021 may be related to the memory 2024 storing a program code and data. The memory may be referred to as a computer-readable medium.

In the present disclosure, a wireless device may be the eNB, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, an MTC device, an IoT device, a medical device, a pin-tec device (or financial device), a security device, a climate/environmental device, or other devices related to fourth industrial revolution fields or 5G services. For example, the UAV may be a flying object that is not ridden by people but that flies by radio control signals. For example, the MTC device and the IoT device as devices that do not require direct human intervention or manipulation may include a smart meter, a vending machine, a thermometer, a smart bulb, a door lock, or various sensors. For example, the medical device as a device used for the purpose of diagnosis, treatment, alleviation, therapy, or prevention of a disease or a device used for the purpose of inspecting, replacing, or modifying a structure or function may include a treatment equipment, a surgical device, an (in vitro) diagnostic device, a hearing aid, a procedure device, etc. For example, the security device as a device installed to prevent a risk that may occur and to maintain safety may include a camera, a CCTV, a black box, etc. For example, the pin-tec device as a device capable of providing financial services such as mobile payment may include a payment device, a point of sales (POS), etc. For example, the climate/environmental device may mean a device for monitoring or predicting a climate/environment.

In the present disclosure, the UE may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), a foldable device, etc. For example, the HMD as a display device worn on the head may be used to implement AR or VR.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Although the method for transmitting and receiving data in the wireless communication system of the present disclosure has been described with reference to an example applied to a 3GPP LTE/LTE-A system or a 5G system, the method may be applied to various wireless communication systems in addition to the 3GPP LTE/LTE-A system or 5G system.

What is claimed is:

1. A method for transmitting/receiving data by a first relay node in a wireless communication system, the method comprising:
   receiving configuration information from a network node,
   wherein the configuration information includes a timing offset for transmitting downlink data; and
   transmitting, to a second relay node, the downlink data based on the configuration information,
   wherein transmission timing of the downlink data is determined based on the timing offset and a timing advance (TA), and
   wherein, based on that uplink transmission and downlink transmission are performed by using the Time Division Multiplexing (TDM) method through a backhaul link or an access link, a transmission gap for matching a boundary between symbols is inserted between the uplink transmission and the downlink transmission.

2. The method of claim 1, wherein the TA is acquired from the network node or calculated based on the configuration information.

3. The method of claim 1, wherein based on the first relay node simultaneously performing transmission/reception of data through the backhaul link and the access link by using Frequency Division Multiplexing (FDM), different slot formats are configured in the backhaul link and the access link in order to match transmission timing with another node of the first relay node or the terminal.

4. The method of claim 1, wherein the transmission timing and reception timing of uplink transmission and downlink transmission of the network node, the first relay node, and the second relay node are absolutely the same.

5. The method of claim 4, further comprising:
   receiving a synchronization signal from the network node; and
   performing synchronization with the network node based on the synchronization signal.

6. The method of claim 1, wherein the transmission gap is divided into a first transmission gap inserted when the uplink transmission is switched to the downlink transmission or a second transmission gap inserted when the downlink transmission is switched to the uplink transmission.

7. The method of claim 6, wherein at least one of the first transmission gap or the second transmission gap is acquired from the network node.

8. The method of claim 7, wherein when the first transmission gap or the second transmission gap is acquired from the network node,
   the first transmission gap is configured to a value acquired by excluding the second transmission gap from a symbol length, and
   the second transmission gap is configured to a value acquired by excluding the first transmission gap from the symbol length.

9. The method of claim 1, wherein a first transmission gap for matching a symbol boundary of a backhaul link and the symbol boundary of an access link is inserted when transmission through the backhaul link is switched to transmission through the access link, and
   a second transmission gap for matching the symbol boundary of the backhaul link and the symbol boundary of the access link is inserted when the transmission through the access link is switched to the transmission through the backhaul link.

10. The method of claim 9, wherein at least one of the first transmission gap and/or the second transmission gap is acquired from the network node.

11. A first relay node for transmitting/receiving data in a wireless communication system, the first relay node comprising:
   a transceiver;
   at least one processor; and
   at least one computer memory operably connectable to the at least one processor and storing instructions that, based on being executed by the at least one processor, wherein the operations comprise:
   receiving configuration information from a network node,
   wherein the configuration information includes a timing offset for transmitting downlink data, and
   transmitting, to a second relay node, the downlink data based on the configuration information,
   wherein transmission timing of the downlink data is determined based on the timing offset and a timing advance (TA), and
   wherein, based on that uplink transmission and downlink transmission are performed by using the Time Division Multiplexing (TDM) method through a backhaul link or an access link, a transmission gap for matching a boundary between symbols is inserted between the uplink transmission and the downlink transmission.

* * * * *